(12) United States Patent
O'Driscoll et al.

(10) Patent No.: US 11,943,348 B1
(45) Date of Patent: Mar. 26, 2024

(54) METHOD AND SYSTEM FOR SECURE CRYPTOGRAPHIC EXCHANGES USING A FIVE-PASS PROTOCOL

(71) Applicant: Q-Net Security, Inc., St. Louis, MO (US)

(72) Inventors: Jeremiah Cox O'Driscoll, Maryland Heights, MO (US); Jerome R. Cox, Jr., St. Louis, MO (US)

(73) Assignee: Q-Net Security, Inc., St. Louis, MO (US)

( * ) Notice: Subject to any disclaimer, the term of this patent is extended or adjusted under 35 U.S.C. 154(b) by 506 days.

(21) Appl. No.: 17/119,838

(22) Filed: Dec. 11, 2020

Related U.S. Application Data

(60) Provisional application No. 62/946,534, filed on Dec. 11, 2019.

(51) Int. Cl.
*H04L 9/08* (2006.01)
*G06F 17/16* (2006.01)

(52) U.S. Cl.
CPC ............ *H04L 9/0869* (2013.01); *G06F 17/16* (2013.01); *H04L 2209/16* (2013.01)

(58) Field of Classification Search
CPC .... H04L 9/0869; H04L 2209/16; G06F 17/16
See application file for complete search history.

(56) References Cited

U.S. PATENT DOCUMENTS

| 9,608,812 | B2 * | 3/2017 | Ohya | H04L 9/0662 |
| 2012/0166791 | A1 * | 6/2012 | Barton | H04L 9/0844 |
| | | | | 713/150 |
| 2015/0156018 | A1 * | 6/2015 | Ohya | H04L 9/0869 |
| | | | | 380/46 |

(Continued)

OTHER PUBLICATIONS

Lyubashevsky et al., "On Ideal Lattices and Learning with Errors Over Rings", Journal of the ACM, 2013, pp. 1-23, vol. 60, No. 6.

(Continued)

*Primary Examiner* — Hee K Song
(74) *Attorney, Agent, or Firm* — Thompson Coburn LLP

(57) ABSTRACT

Cryptographic techniques are disclosed which employ at least a five-pass protocol (5PP) for a cryptographic exchange of a secret data matrix between two computer systems. This 5PP approach improves the functioning of the computer systems by making their encrypted communications more resistant to potential quantum computing-based attacks while still resisting brute-force attacks by eavesdroppers. For example, the 5PP approach can be used to improve public-key cryptography. The system may comprise a first computer system and a second computer system, where a secret data matrix is known by the first computer system but is not shared with the second computer system in unobscured form. The first and second computer systems can be configured to communicate with each other over a network to share a series of at least five messages in at least five passes between each other that collectively hide the secret data matrix using reversible logic operations that obscure the secret data matrix according to at least five parameters of which (1) at least two are known by the first computer system but are not shared with the second computer system in unobscured form and (2) at least three are known by the second computer system but are not shared with the first computer system in unobscured form.

41 Claims, 14 Drawing Sheets

(56) References Cited

U.S. PATENT DOCUMENTS

2017/0324548 A1* 11/2017 Anshel ................. H04L 9/0844
2019/0386828 A1* 12/2019 Garcia Morchon .... G06F 7/582
2021/0091942 A1*  3/2021 Nguyen ............... H04L 9/0866

OTHER PUBLICATIONS

Periner et al., "Quantum Resistant Public Key Cryptography: A Survey," Proceedings of the 8th Symposium on Identity and Trust on the Internet, Apr. 2009, pp. 85-93.

Rivest et al., "A Method for Obtaining Digital Signatures and Public-Key Cryptosystems," Communications of the ACM, 1978, pp. 1-15, vol. 21, No. 2.

Shor, "Algorithms for Quantum Computation: Discrete Logarithms and Factoring", Proceedings, 35th Annual Symposium on Foundations of Computer Science, 1994, pp. 124-134.

Shor, "Polynomial-Time Algorithms for Prime Factorization and Discrete Logarithms on a Quantum Computer," SIAM Review, pp. 303-332, vol. 41, No. 2; Originally published in SIAM Journal on Computing, 1997, pp. 1484-1509, vol. 26, No. 5.

Wikipedia, "Grover's Algorithm", edit date Nov. 18, 2019, pp. 1-6, retrieved from https://en.wikipedia.org/w/index.php?title=Grover%27s_algorithm&oldid=925903569 on Nov. 18, 2019.

Wikipedia, "Supersingular Isogeny Key Exchange", edit date Nov. 11, 2019, pp. 1-7, retrieved from https://en.wikipedia.org/w/index.php?title=Supersingular_isogency_key_exchange&oldid-925602841 on Nov. 11, 2019.

Wikipedia, "Three-Pass Protocol", edit date Oct. 11, 2019, pp. 1-3, retrieved from https://en.wikipedia.org/w/index.php?title=Three-pass_protocol&oldid=920722763 on Oct. 11, 2019.

* cited by examiner

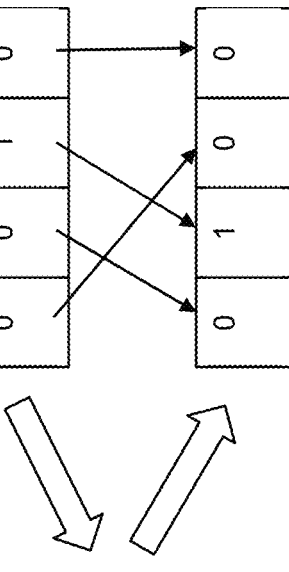
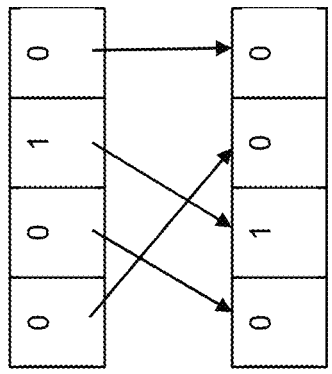
Figure 9A
Figure 9B
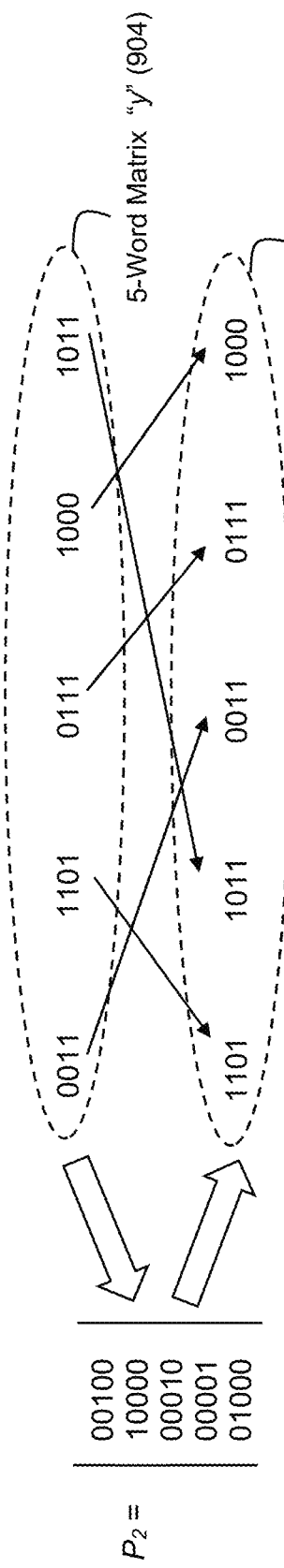
Figure 9C

1. Calculate $\overline{d_{ij}} \oplus c_i$ for $i \in \{1,2,\cdots m\}$ and $j = 1$
2. Sum the terms $\sum_{i=1}^{m} \overline{d_{ij}} \oplus c_i$ for $j = 1$
3. If $(\sum_{i=1}^{m} \overline{d_{ij}} \oplus c_i)_k = m$ for $j = 1$ then save $k$ as $g_j$
4. Repeat for $j \in \{2,3,\cdots n\}$
5. If more than one $g_j$ exists for any $j$ the result of the PRA is ambiguous
6. If only one $g_j$ exists for each $j$, the result of the PRA is unique
7. The vector $G = \{g_1, g_2, \cdots g_m\}$ then specifies the location of the 1s in the $P_1$ matrix Where: $\overline{d_{ij}} \oplus c_i \triangleq \{\overline{d_{ij}} \oplus c_{i1}, \overline{d_{ij}} \oplus c_{i2}, \cdots \overline{d_{ij}} \oplus c_{im}\}$

$\{\overline{d_{11}} \otimes c_1, \overline{d_{12}} \otimes c_1, \overline{d_{13}} \otimes c_1, \overline{d_{14}} \otimes c_1\} = \{\{1,0,1,1\},\{1,0,1,1\},\{0,1,0,0\},\{1,0,1,1\}\}$ $\{\overline{d_{21}} \otimes c_2, \overline{d_{22}} \otimes c_2, \overline{d_{23}} \otimes c_2, \overline{d_{24}} \otimes c_2\} = \{\{1,0,0,0\},\{0,1,1,1\},\{0,1,1,1\},\{0,1,1,1\}\}$ $\{\overline{d_{31}} \otimes c_3, \overline{d_{32}} \otimes c_3, \overline{d_{33}} \otimes c_3, \overline{d_{34}} \otimes c_3\} = \{\{1,0,1,0\},\{1,0,1,0\},\{0,1,0,1\},\{0,1,0,1\}\}$ $\{\overline{d_{41}} \otimes c_4, \overline{d_{42}} \otimes c_4, \overline{d_{43}} \otimes c_4, \overline{d_{44}} \otimes c_4\} = \{\{1,1,0,0\},\{0,0,1,1\},\{1,1,0,0\},\{0,0,1,1\}\}$    1100

$\sum_{i=1}^{4} \{\overline{d_{i1}} \otimes c_i, \overline{d_{i2}} \otimes c_i, \overline{d_{i3}} \otimes c_i, \overline{d_{i4}} \otimes c_i\} = \{\{4,1,2,1\},\{2,1,4,3\},\{1,4,1,2\},\{1,2,3,4\}\}$ The locations of the value 4 in these vectors show where the "1"s are located in each row of $P_1$.

⇩

$G = \{1,3,2,,4\},$

⇩

$P_i = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$

$\{\overline{d_{11}} \otimes c_1, \overline{d_{12}} \otimes c_1, \overline{d_{13}} \otimes c_1, \overline{d_{14}} \otimes c_1\} = \{\{1,0,1,1\},\{1,0,1,1\},\{0,1,0,0\},\{1,0,1,1\}\}$ $\{\overline{d_{21}} \otimes c_2, \overline{d_{22}} \otimes c_2, \overline{d_{23}} \otimes c_2, \overline{d_{24}} \otimes c_2\} = \{\{1,0,0,0\},\{0,1,1,1\},\{0,1,1,1\},\{0,1,1,1\}\}$ $\{\overline{d_{31}} \otimes c_3, \overline{d_{32}} \otimes c_3, \overline{d_{33}} \otimes c_3, \overline{d_{34}} \otimes c_3\} = \{\{1,0,0,0\},\{0,1,1,1\},\{0,1,1,1\},\{0,1,1,1\}\}$ $\{\overline{d_{41}} \otimes c_4, \overline{d_{42}} \otimes c_4, \overline{d_{43}} \otimes c_4, \overline{d_{44}} \otimes c_4\} = \{\{1,1,0,0\},\{0,0,1,1\},\{1,1,0,0\},\{0,0,1,1\}\}$  1100

$\sum_{i=1}^{4}\{\overline{d_{i1}} \otimes c_i, \overline{d_{i2}} \otimes c_i, \overline{d_{i3}} \otimes c_i, \overline{d_{i4}} \otimes c_i\} = \{\{4,1,1,1\},\{1,2,4,4\},\{1,4,2,2\},\{1,2,4,4\}\}$

The locations of the value 4 in these vectors show where the "1"s are located in each row of $P_1$.

$G = \{1, \{3,4\}, 2, \{3,4\}\}$,

$$P_i = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \text{ or } P_1' = \begin{bmatrix} 1 & 0 & 0 & 0 \\ 0 & 0 & 0 & 1 \\ 0 & 1 & 0 & 0 \\ 0 & 0 & 1 & 0 \end{bmatrix}$$

METHOD AND SYSTEM FOR SECURE CRYPTOGRAPHIC EXCHANGES USING A FIVE-PASS PROTOCOL

CROSS-REFERENCE AND PRIORITY CLAIM TO RELATED PATENT APPLICATION

This patent application claims priority to U.S. provisional patent application Ser. No. 62/946,534, filed Dec. 11, 2019, and entitled "Method and System for Secure Cryptographic Exchanges Using a Five-Pass Protocol", the entire disclosure of which is incorporated herein by reference.

INTRODUCTION

Public-key cryptography has been a popular choice for a multitude of cybersecurity applications since the publication just over four decades ago of the RSA algorithm by Rivest, Shamir and Adleman. See Rivest, R. L., Shamir, A., Alderman, L., "A method for obtaining digital signatures and public-key cryptosystems," *Communications of the ACM*, v. 21, no. 2, February 1978. These algorithms have led to the development of the Public-Key Infrastructure (PKI) and the private exchange of keys between a source and a destination even when the two have no prearranged shared secret. These algorithms rely on a classically "hard" problem such as factorization of large integers or the computation of discrete logarithms. However, Shor's Algorithm (see Shor, P. W. "Algorithms for quantum computation: discrete logarithms and factoring", *Proceedings 35th Annual Symposium on Foundations of Computer Science, IEEE Comput. Soc. Press*, November 1994), its generalizations and the advent of quantum computing will likely expose weaknesses in public-key cryptography, rendering it insecure. Thus, cryptography with better Quantum-Compute Resistance (QCR) is urgently needed. Implementations providing QCR when applied to public-key algorithms can be referred to as Post-Quantum Cryptography (PQC).

An example of a known PQC technique is Supersingular Isogeny Diffie-Hellman (SIDH), which involves the use of supersingular elliptic curves, a scheme that employs elliptic curves in a far different manner than found in classical cryptography. This protocol allows both the source and destination to calculate a value (the j-invariant) of two curves specially generated so that the value is the same. See Wikipedia, "Supersingular isogeny key exchange", edit date Nov. 11, 2019.

Another example of a known PQC technique is based on the problem of Ring Learning With Errors (RLWE) (see Lyubashevsky, Vadim; Peikert, Chris; Regev, Oded (2012), "On Ideal Lattices and Learning with Errors Over Rings", *Jour of the ACM*, v. 60, no 6, November 2013), which may be reducible to an non-deterministic, polynomial-time-hard (NP-hard) problem.

A general status of PQC is surveyed in Penner, R. A., Cooper, D. A., "Quantum Resistant Public Key Cryptography: A Survey," 8*th Symposium on Identity and Trust on the Internet*, April 2009.

While these options for PQC have promise, they are, of necessity, mathematically complex. In fact, their mathematical complexity is what thwarts an attacker's discovery of the key to be exchanged. However, can we know what computational discoveries lie ahead that may result from future quantum, magnetic or 3D computing progress? Given the uncertain nature of how well PQC techniques rooted in mathematical complexity might operate in the face of future computational discoveries, the inventors have sought to invent cryptographic techniques such as covert key exchange that depend on numerical complexity rather than mathematical complexity. By numerical complexity, we mean operations that are individually simple but become complex because of the massive number of operations required. This is in contrast to mathematical complexity for which no known and efficient algorithm exists to achieve a solution using present or anticipated computational equipment.

An example of a known, numerically simple cryptography technique is the Three-Pass Protocol (3PP). See Wikipedia, "Three-pass protocol", edit date Oct. 11, 2019. The classic 3PP seeks to allow a source to covertly communicate a secret to a destination. The idea for this protocol comes from a classic analogy with a trunk, one that contains a secret and is protected by the source's padlock (A) on the $1^{st}$ and $2^{nd}$ passes and by the destination's padlock (B) on the $2^{nd}$ and $3^{rd}$ passes. To be successful in passing the trunk's secret covertly from the source to the destination, the 3PP approach would need to be:

- Confidential. Key A must be known only to the source, and key B must be known only to the destination.
- Commutative. Changing the order of the locking or unlocking of the two padlocks should be possible without changing the outcome.
- Capable. The protocol must successfully transfer the secret from the source to the destination.

FIG. 1 shows an elementary implementation of 3PP suitable for digital transmission. As shown by FIG. 1, in the $1^{st}$ pass, the secret x is obscured by the key A. Similarly, in the $2^{nd}$ pass, the secret is obscured by A+B; and in the $3^{rd}$ pass, the secret is obscured by B. However, with this 3PP implementation, an eavesdropper can solve for x based on the eavesdropped values for $v_1$, $v_2$, and $v_3$ (where $x=v_3-v_2+v_1$). This is equivalent to using linear algebra with the three observations ($v_1$, $v_2$ and $v_3$) and the three unknowns, x, A and B. The operations shown by FIG. 1 for 3PP do commute since addition commutes. The FIG. 1 implementation of 3PP is also capable since the secret is successfully transferred. However, the confidentiality condition fails for this implementation of 3PP because an eavesdropper can easily solve for x. The failure of encryption using addition is easy to understand, but even more complex 3PP encryption schemes we have explored can be breached by more complex analysis techniques.

In fact, efforts known by the inventors and reported in the literature to make the 3PP secure have utilized computationally-hard functions requiring exponential-time algorithms such as exponentiation modulo a large prime (Shamir) or exponentiation in the Galois field (Massey-Omura). See Wikipedia, "Three-pass protocol", edit date Oct. 11, 2019. Unfortunately, these functions are expected to be breached by polynomial-time algorithms when executed on a quantum computer. See Shor, P. W., "*Polynomial-Time Algorithms for Prime Factorization and Discrete Logarithms on a Quantum Computer,*" *SIAM Rev.,* 41(2), pp. 303-332.

In an effort to make 3PP more secure in order to create a numerically complex but mathematically simple cryptography technique, the inventors have also considered versions of 3PP that add permutations at the source and at the destination. FIG. 2 shows an example of an attempt by the inventors at designing a secure 3PP with permutations at the source and destination. The inventors note that permutations, in isolation, do not commute, but permutations can be made to commute through disassociation where the secret is divided into n words of m bits each. This allows the permutations of the bits in a word to be independent of the permutations of the n words in the matrix of words. In the 3PP approach of FIG. 2, the permutation $P_1$ applies within individual words, and the permutation $P_2$ applies among the n word matrix. The $P_1$ permutation matrix has the same value for each of the n words to which it applied. In addition, the permutations invoked in each of the passes prevent the discovery of x via simple means, such as linear algebra. The capital letter A is identical across the entire matrix of n words, whereas the lower-case letters denoting the matrices x and b differ among their n words. The 3PP implementation of FIG. 2 is not capable since the transpose of $P_1$ (denoted $P_1^t$) is known only to the source; which means that the destination cannot discover the matrix x if $P_1$ and $P_1^t$ are to remain confidential. The 3PP implementation of FIG. 2 can be made capable by making $P_1$ (or $P_1^t$) public, which allows the destination to know or compute $P_1^t b$. However, making $P_1$ (or $P_1^t$) public would allow an eavesdropper to compute $v_2 - P_1 v_3 = A$. Knowing A and $P_1$, the discovery of x from $v_1$ is possible by the eavesdropper. Thus, making $P_1$ (or $P_1^t$) public makes the 3PP implementation of FIG. 2 capable, but compromises confidentiality.

Accordingly, the inventors believe that technical improvements in the art are needed to make cryptographic exchanges of data more secure, particularly in the face of potential quantum computing-based attacks on existing public-key cryptography techniques.

Toward this end, the inventors disclose cryptographic techniques which employ at least a five-pass protocol (5PP) for a cryptographic exchange of a secret data matrix between two computer systems. It should be understood that the term "matrix" as used herein encompasses any array of bits, whether that array be a 1D array with a single row of bits, a 2D array with multiple rows of bits, or other matrices of bits. This 5PP approach improves the functioning of the computer systems by making their encrypted communications more resistant to potential quantum computing-based attacks while still resisting brute-force attacks by eavesdroppers.

For example, the inventors disclose a system for cryptographic exchange of a secret data matrix, the system comprising a first computer system and a second computer system, where the secret data matrix is known by the first computer system but is not shared with the second computer system in unobscured form. The first and second computer systems can be configured to communicate with each other over a network to share a series of at least five messages in at least five passes between each other that collectively hide the secret data matrix using reversible logic operations that obscure the secret data matrix according to at least five parameters. These parameters can comprise (1) first and second parameters that are known by the first computer system but are not shared with the second computer system in unobscured form, and (2) third, fourth, and fifth parameters that are known by the second computer system but are not shared with the first computer system in unobscured form. Such parameters can be referred to as private parameters (in contrast to public parameters, where public parameters are parameters that are shared between computer systems in unobscured form). On the basis of these at least five messages, the second computer system is able to derive the secret data matrix.

With a first example embodiment, the series of at least five messages includes (1) first, third, and fifth message matrices that are communicated from the first computer system to the second computer system and (2) second and fourth message matrices that are communicated from the second computer system to the first computer system. Moreover, the second computer system can derive the secret data matrix by first deriving the first parameter based on the fifth message matrix and the fifth parameter. Once the first parameter is derived, the second computer system is able to solve for the secret data matrix based on its knowledge of the derived first parameter, the fourth message matrix, and the fifth message matrix.

With a second example embodiment, at least eight messages can be used in at least five passes between the first and second computer systems that collectively hide the secret data matrix using reversible logic operations that obscure the secret data matrix according to at least nine private parameters of which (1) six are known by the first computer system but not shared with the second computer system in unobscured form and (2) three of which are known by the second computer system but not shared with the first computer system in unobscured form.

The parameters can be randomly generated by their respective computer systems, and each parameter can be independent of the other parameters with respect to how they are generated. Furthermore, in the first example embodiment, the second, third, and fifth parameters can be data matrices; while the first parameter can be a bit-wise permutation operator and the fourth parameter can be a word-wise permutation operator. In the second example embodiment, the parameters can include 4 data matrices and 5 permutation matrices (three of which provide column permutation and two of which provide row permutation).

As examples, the reversible logic operations can include permutation operations, addition operations, subtraction operations, AND operations, OR operations, exclusive OR (XOR) operations, digital linear transform operations (such as Fast Fourier Transform (FFT) operations, multiplication operations, and/or division operations. It is worth noting that digital linear transforms such as FFTs may introduce a computational load on the system that would be greater than the load imposed by simpler operations such as addition or subtraction; accordingly a practitioner may prefer simpler operations. It is also worth noting that the use of multiplication and division can introduce complexities when using modular arithmetic, so a practitioner may prefer simpler operations. However, it should be understood that practitioners may nevertheless choose to use digital linear transforms, multiplication, and/or division to facilitate obscuration of the secret data matrix within the series of messages that are communicated between the two computer systems.

These and other features and advantages of the present invention will be described hereinafter to those having ordinary skill in the art.

BRIEF DESCRIPTION OF THE DRAWINGS

FIG. 9A shows example permutation matrices for $P_1$ and $P_2$ that can be used in a 5PP approach in accordance with the FIG. 3 embodiment.

FIG. 9B shows an example of how bit-wise permutation can be applied using an example permutation matrix $P_1$ in accordance with the FIG. 3 embodiment.

FIG. 9C shows an example of how word-wise permutation can be applied using an example permutation matrix $P_2$ in accordance with the FIG. 3 embodiment.

FIG. 10 shows pseudo-code for an example permutation recovery algorithm for execution by the destination computer system that derives the permutation matrix $P_1$ from the destination computer's knowledge of $v_5$, b, and c in accordance with the FIG. 3 embodiment.

FIG. 11A shows an example set of values for c and d that result in an unambiguous derivation of $P_1$ in accordance with the FIG. 3 embodiment.

FIG. 11B shows an example set of values for c and d that result in an ambiguous derivation of $P_1$ in accordance with the FIG. 3 embodiment.

DETAILED DESCRIPTION OF EXAMPLE EMBODIMENTS

The 5PP approaches described herein provide techniques for securely exchanging a secret data matrix between a source computer system and a destination computer system in a manner that is designed to more reliably maintain the secrecy of the secret data matrix as to other computer systems. In this fashion, the secret data matrix can support operations such as key services (e.g., key generation) by the source and destination computer systems (such as for keys that would be used in symmetric encryption/decryption (e.g., AES encryption/decryption)).

Figure 1:
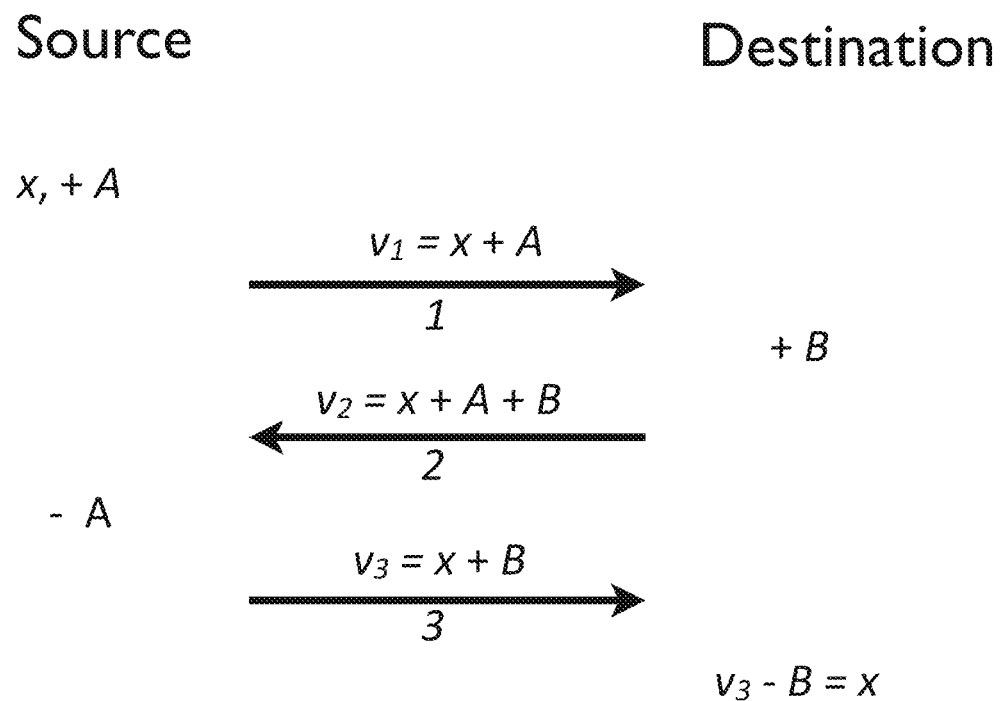
FIG. 1 shows an example of a conventional three-pass protocol (3PP) for exchanging a secret between a source and destination.
Figure 2:
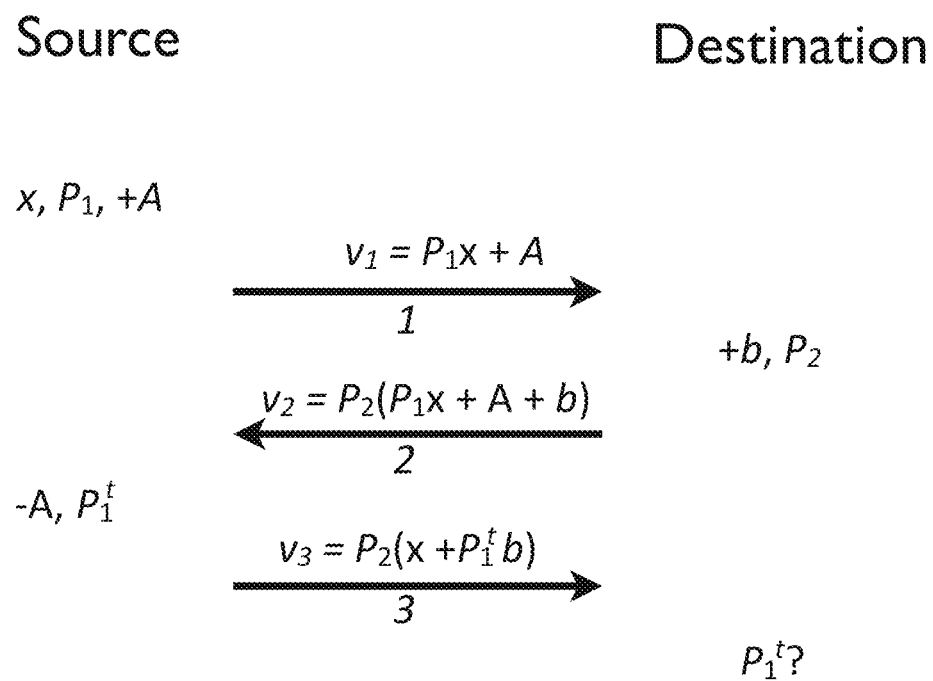
FIG. 2 shows an example of a 3PP for exchanging a secret between a source and destination, but where one of the parameters used by the source computer system for obscuring the secret would need to be shared in unobscured form with the destination in order for the destination to derive the secret.
Figure 3:
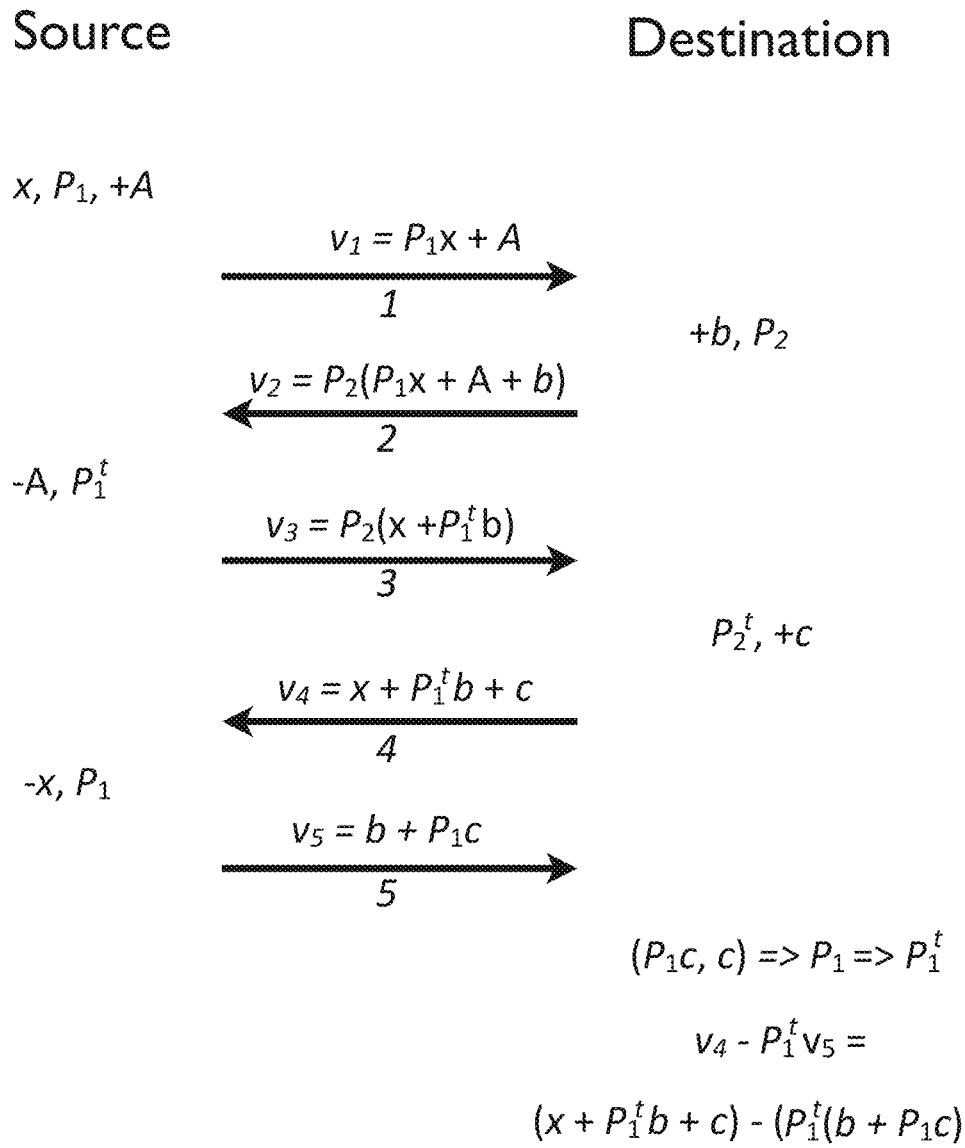
FIG. 3 shows an example five-pass protocol (5PP) for securely exchanging a secret data matrix between a source computer system and a destination computer system.

First Example 5PP Embodiment (FIG. 3)

FIG. 3 shows an example five-pass protocol (5PP) for securely exchanging a secret data matrix between a source computer system and a destination computer system. The 5PP of FIG. 3 obscures the secret data matrix x using 5 parameters, where the first and second parameters ($P_1$ and A, respectively) are known by the source computer system but not shared in unobscured form with the destination computer system, and where the third, fourth, and fifth parameters (b, $P_2$, and c, respectively) are known by the destination computer system but not shared in unobscured form with the source computer system. Each pass is shown in FIG. 3 by an arrow between the source and destination, and the sequence of passes is numbered 1 through 5 by FIG. 3.

Figure 4A:
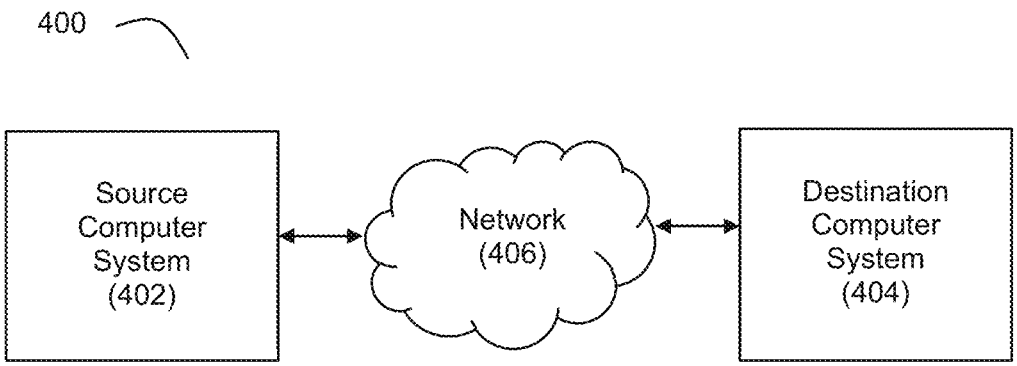
FIG. 4A shows an example network of computer systems in which the 5PP approach of FIGS. 3 and 12 can be implemented.

FIG. 4A shows an example networked system 400 in which the 5PP cryptographic approaches can be implemented, where the source takes the form of a source computer system 402 that is in communication with the destination computer system 404 over a network 406. Source and destination computer systems 402, 404 may each comprise any electronics system that includes one or more processors with one or more associated memories that cooperate with each other to implement the processing logic discussed herein. The one or more processors may take the form of any computational resource capable of performing the operations described herein. For example, the processor may be a general purpose processor (GPP) such as a CPU that executes software to carry out the operations described herein. The software may take the form of processor-executable instructions that are resident on a non-transitory computer-readable storage medium such as computer memory, and the processor may fetch and execute the software instructions to carry out the operations described herein. As another example, the processor may be a special purpose or fixed purpose processor that is tailored for implementing the 5PP approaches described herein (e.g., an application-specific integrated circuit (ASIC)). As yet another example, the processor may take the form of a reconfigurable logic device, such as a field programmable gate array (FPGA). The FPGA can be loaded with a bitfile or the like that serves as firmware to configure the configurable logic gates of the FPGA so that the FPGA becomes effectively hard-wired to carry out the operations described herein. Accordingly, the FPGA can implement a hardware logic circuit that applies massive parallelism and pipelining to hardware accelerate the processing operations described herein. As yet another example, the processor may take the form of a graphics processor unit (GPU) which can be very suitable for performing the bit level manipulations described herein.

The source and destination computer systems 402, 404 may each also include network connectivity for sending messages over the network 406 to each other. The network 406 can take the form of any communications network or combination of communications networks, whether wired or wireless, capable of communicating data between a source computer system and a destination computer system, including but not limited to wide area networks such as the Internet, local area networks, etc. For the purpose of analysis below, we will assume that network 406 provides a reliable, high data-rate connection between the source computer system 402 and destination computer system 404 (and that the 5PP approaches discussed herein need not be sensitive to latencies of the order of a network roundtrip time).

Figure 4B:
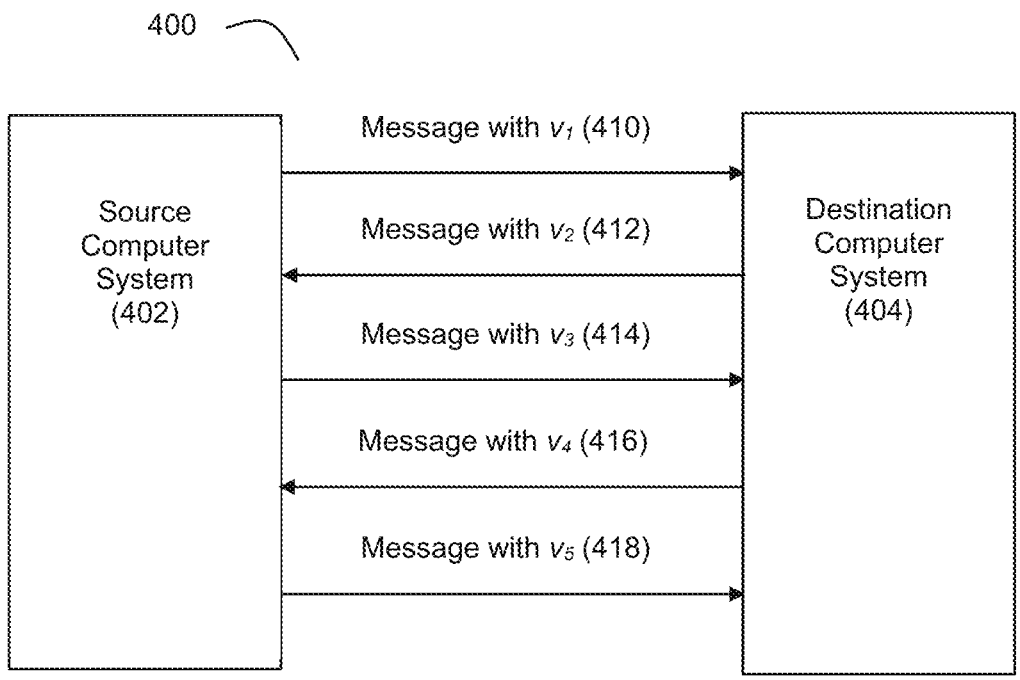
FIG. 4B shows how a series of five messages can be exchanged between source and destination computers as part of a 5PP approach.

FIG. 3 also shows different message matrices $v_1$, $v_2$, $v_3$, $v_4$, and $v_5$ that are sent between the source and destination for each pass. As shown by FIG. 4B, (1) the matrix $v_1$ can be included in message 410 that is sent from the source computer system 402 to the destination computer system 404 in the first pass, (2) the matrix $v_2$ can be included in message 412 that is sent from the destination computer system 404 to the source computer system 402 in the second pass, (3) the matrix $v_3$ can be included in message 414 that is sent from the source computer system 402 to the destination computer system 404 in the third pass, (4) the matrix $v_4$ can be included in message 416 that is sent from the destination computer system 404 to the source computer system 402 in the fourth pass, and (5) the matrix $v_5$ can be included in message 418 that is sent from the source computer system 402 to the destination computer system 404 in the fifth pass. Each message 410, 412, 414, 416, and 418 may be broken up over multiple packets transmitted across network 406 if necessary.

In each pass, FIG. 3 shows that obscuration of the secret data matrix x can be provided over the series of five passes via reversible logic operations that commute such as permutations and modulo additions/subtractions with respect to the first, second, third, fourth, and fifth parameters. Thus, with FIG. 3, the confidentiality of each pass is protected by both a permutation and a modulo addition (or subtraction). The modulo 2 additions/subtractions can be implemented as XOR operations.

The permutations can be two permutation operations that are commutative: permuting among words (word-wise permutation—see the example of FIG. 9C discussed below) and permuting the bits of each word (bit-wise (or within-word) permutation—see the example of FIG. 9B discussed below). These permutations alone are not secure because an observer can observe the before and after of each permutation; and with these two observations, it is possible to reveal the permutation itself by means of a permutation recovery algorithm (PRA) (see Appendix 1). Therefore, we want to avoid allowing an observer to see the before and after of a permutation. This can be accomplished by applying an additional reversible logic operation such as a modular arithmetic operation in connection with each permutation. XOR operations are particularly simple and effective for this.

With the example of FIG. 3, within-word permutations ($P_1$) are XORed with a single random constant and among-words permutations ($P_2$) are XORed with a random number for each word. A constant can be used when permuting bits of each word ($P_1$) because, while all words are permuted and XORed in the same way, it is impossible to determine which changes are from which operation. The attacker is left with only one possibility, a brute-force attack with complexity of $O(2^m)$ presuming the attacker picks the values for m and n correctly. To maintain this level of security it is desirable to use n distinct random numbers to obscure the among-words permutation ($P_2$). Moreover, it is desirable to use a high entropy Random Bit Generator (RBG) to generate the values for the private parameters in order to avoid the weakening of the estimated attack complexities discussed below. Otherwise, correlations in the numbers generated could potentially be used to aid an attacker. But, some practitioners may choose to employ other techniques for generating the private parameters, such as pseudo-random bit generation or other algorithmic techniques capable of producing the bit values for the private parameters which the practitioner deems as providing effective resistance against certain levels of attack.

The permuting of bits within each word and the permuting among words are two functions that commute. This is true because the permuting among the words does not affect the bits within the words and the permuting of bits within each word has an identical effect throughout all the words. However, the addition of the XOR steps defeats the ability to commute the two permutations. This observation eliminates the possibility of using the XOR steps to achieve a confidential, commutative and capable three-pass protocol. Without commutability, the source cannot fully remove its influence on the key from the first pass leaving only the destination's influence on the key in the third pass. To make a protocol using permutations and XORs in this manner capable, more information is needed on the destination side than is available with a 3PP. At least one more roundtrip between the source to the destination is needed. Thus, if we use two permutations as the primary mechanism for encryption, a minimum of five passes will be required for the destination to be able to extract the secret data matrix x.

Figure 8:
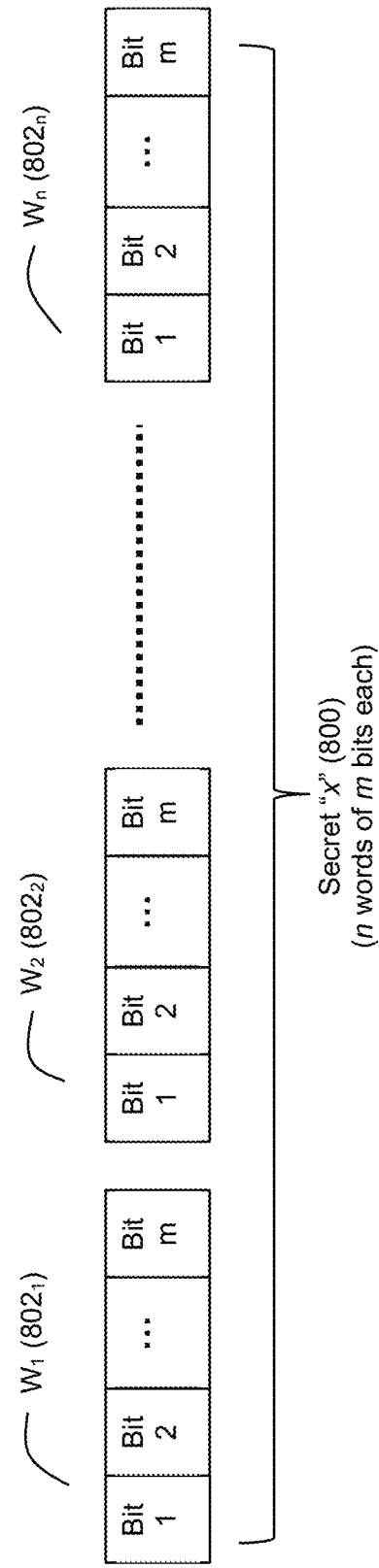
FIG. 8 shows an example structure for a secret data matrix x.

The secret data matrix x can comprise n words of m bits each. FIG. 8 shows an example secret data matrix x (800) where each word $W_i$ ($802_1$, $802_2$, ... $802_n$) of x has m bits (Bit 1, Bit 2, ..., Bit m). While a practitioner may choose any values for n and m that are greater than 1 if desired, it should be understood that larger values of n and m will enhance the security of the system. The value of m determines the brute-force effort required to guess A. The expected number of guesses required for this brute-force effort is $2^{(m-1)}$. To make the number of guesses for an attack on $P_1$ equivalent, the value of n should be such that $n! \geq 2^m$. Example values of m and n that require the same brute-force effort to break AES 256 are m=256 and n=64. Accordingly, a practitioner may find that using m=256 and n=64 is suitable for the system. However, as noted above it should be understood that practitioners may choose different values of m and n if desired. For example, values of m between 64 and 1024 (or higher) may be desirable for some practitioners. Also, values of n between 16 and 170 (or higher) may be desirable for some practitioners.

The parameter A can take the form of a matrix of n words of m bits each, where each word of A shares the same value (or equivalently an m-bit word that is used n times to obscure the bits within each word of $v_1$ and $v_2$). Thus, as a simple example where n is 3 and m is 4, an example value for A can be the three-word combination {1011, 1011, 1011}, (or thought of as the single word {1011} that affects each of the n words the same).

The parameter b can take the form of a data matrix whose size is m×n bits in length, where b can include n words of m bits each, where each word of b may exhibit a different value. Thus, as a simple example where n is 3 and m is 4, an example value for b can be the three-word combination {0100, 1011, 0010}.

The parameter c can take the form of a data matrix whose size is m×n bits in length, where c can include n words of m bits each, where each word of c may exhibit a different value. Thus, as a simple example where n is 3 and m is 4, an example value for c can be the three-word combination {0011, 1000, 0100}.

The permutation matrix $P_1$ can take the form of an m×m array, where each row and column of $P_1$ will have only a single "1"/"true" value while all other values will be "0"/"false", as shown by FIG. 9A. $P_1$ serves as a bit-wise permutation agent that permutes the positions of bits within each word of a matrix made up of words such as x. FIG. 9B shows an example (where m=4) of how bit-wise permutation can be performed on the bits of a word such as a simple example of a 4-bit word 802 of x. As shown by FIG. 9B, (1) the true value within the first row of $P_1$ identifies the bit position to which the first bit of word 802 will be permuted, (2) the true value within the second row of $P_1$ identifies the bit position to which the second bit of word 802 will be permuted, (3) the true value within the third row of $P_1$ identifies the bit position to which the third bit of word 802 will be permuted, and (4) the true value within the fourth row of $P_1$ identifies the bit position to which the forth bit of word 802 will be permuted. Thus, the $P_1$ shown by FIG. 9B will operate on word 802 of {0010} to produce a bit-wise permuted word 902 of {0100}. This permutation pattern would be repeated over each word of the subject data matrix such as x.

The permutation matrix $P_2$ can take the form of an n×n array, where each row and column of $P_2$ will have only a single "1"/"true" value while all other values will be "0"/ "false", as shown by FIG. 9A. $P_2$ serves as a word-wise permutation agent that permutes the positions of words in a matrix. FIG. 9C shows an example (where n=5, and m=4) of how word-wise permutation can be performed on the words of a 5-word example matrix y (904). As shown by FIG. 9C, (1) the true value within the first row of $P_2$ identifies the word position to which the first word of matrix 904 will be permuted, (2) the true value within the second row of $P_2$ identifies the word position to which the second word of matrix 904 will be permuted, (3) the true value within the third row of $P_2$ identifies the word position to which the third word of matrix 904 will be permuted, (4) the true value within the fourth row of $P_2$ identifies the word position to which the fourth word of matrix 904 will be permuted, and (5) the true value within the fifth row of $P_2$ identifies the word position to which the fifth word of matrix 904 will be permuted. Thus, the $P_2$ shown by FIG. 9C will operate on matrix 904 of {0011, 1101, 0111, 1000, 1011} to produce a word-wise permuted matrix 906 of {1101, 1011, 0011, 0111, 1000}.

FIGS. 9B and 9C show examples where $P_1$ and $P_2$ are read and applied row-wise. It should be understood that $P_1$ and/or $P_2$ can also be read and applied column-wise if desired by a practitioner.

The source computer system 402 can randomly generate the parameters $P_1$ and A. The source computer system 402 can also compute the transpose of $P_1$ ($P_1^t$) after $P_1$ has been generated. Like $P_1$, the source computer system 402 will not share $P_1^t$ with the destination computer system 404 in unobscured form. It should be understood that the random generation with respect to A can be a random generation of an m-bit word of A (where this randomly generated m-bit word is used n times to create $v_1$). Furthermore, the destination computer system 404 can randomly generate the parameters b, $P_2$, and c. The destination computer system 404 can also compute the transpose of $P_2$ ($P_2^t$) after $P_2$ has been generated. Like $P_2$, the destination computer system 404 will not share $P_2^t$ with the source computer system 402 in unobscured form.

With the 5PP approach of FIGS. 3, 4A, and 4B, the matrices $v_1$, $v_2$, $v_3$, $v_4$, and $v_5$ can have a bit length of m×n bits, which can be arranged as n words of m bits each. An eavesdropper has only five observations for each of the n words within $v_1$, $v_2$, $v_3$, $v_4$, and $v_5$. Given the existence of 6 unknown variables (x, $P_1$, A, b, $P_2$, and c) and 5 observations, this makes 5PP highly resistant to eavesdropping attacks, as discussed in greater detail below.

Returning to FIG. 3, the source computer system 400 can compute $v_1$ by (1) bit-wise permuting x according to $P_1$ to yield a bit-wise permutation of x, and (2) then adding A to the bit-wise permutation of x. FIG. 3 shows an example formula for computing $v_1$ in this fashion.

After $v_1$ has been communicated to the destination computer system 404 via message 410, the destination computer system 404 can extract $v_1$ from this message and compute $v_2$ by (1) adding b to $v_1$ to yield a summation of $v_1$ with b, and (2) then word-wise permuting the summation of $v_1$ with b according to $P_2$ to yield a word-wise permutation of the summation of $v_1$ with b. FIG. 3 shows an example formula for computing $v_2$ in this fashion.

After $v_2$ has been communicated to the source computer system 402 via message 412, the source computer system can extract $v_2$ from this message and compute $v_3$ by (1) subtracting A from $v_2$ to yield the difference between $v_2$ and A, and (2) then bit-wise permuting the difference between $v_2$ and A according to the transposed version of $P_1$ ($P_1^t$). FIG. 3 shows an example formula for computing $v_3$ in this fashion. It is worth noting that because the same A is applied to all n words, the word-wise permutation of A via $P_2$ during the second pass will not affect how A interacts with the other components of $v_2$. Accordingly, the subtraction of A at the third pass (prior to the bit-wise permutation according to $P_1^t$) operates to completely remove A from $v_3$. Furthermore, the application of $P_1^t$ operates to remove the effect of $P_1$ on the secret data matrix x.

After $v_3$ has been communicated to the destination computer system 404 via message 414, the destination computer system can extract $v_3$ from this message and compute $v_4$ by (1) word-wise permuting $v_3$ according to the transposed version of $P_2$ ($P_2^t$) to yield a word-wise permutation of $v_3$, and (2) then adding c to the word-wise permutation of $v_3$. FIG. 3 shows an example formula for computing $v_4$ in this fashion. It is worth noting that the use of $P_2^t$ operates to remove the effect of $P_2$ on the secret data matrix x.

After $v_4$ has been communicated to the source computer system 402 via message 416, the source computer system can extract $v_4$ from this message and compute $v_5$ by (1) subtracting x from $v_4$ to yield the difference between $v_4$ and x, and (2) then bit-wise permuting the difference between $v_4$ and x according to $P_1$. FIG. 3 shows an example formula for computing $v_5$ in this fashion. It is worth noting that the use of $P_1$ operates to remove the effect of $P_1^t$ on the parameter b.

After $v_5$ has been communicated to the destination computer system 404 via message 418, the destination computer system can extract $v_5$ from this message, and the destination computer system 404 now has the information it needs to derive the secret data matrix x. To do so, the destination computer system 404 needs to remove the effect of $P_1$ on c. Accordingly, the destination computer system 404 needs to first derive $P_1^t$ based on its knowledge of $v_4$, $v_5$, b, and c. Once $P_1^t$ is derived, the destination computer system can readily compute x as shown by FIG. 3.

To accomplish derivation of $P_1^t$, the destination computer system 404 uses its knowledge of b and $v_5$ to compute the bit-wise permutation of c according to $P_1$ (Pic). That is, $P_1 c = v_5 - b$. The destination computer system 404 can then derive $P_1$ according to the permutation recovery algorithm (PRA) described below in Appendix 1. Once $P_1$ has been derived by the destination computer system 404 using the PRA, the destination computer system 404 can readily derive $P_1^t$ as the transpose of derived $P_1$. With knowledge of the derived $P_1^t$, the destination computer system 404 can compute a bit-wise permutation of $v_5$ according to $P_1^t$. The secret data matrix x can then be derived by the destination computer system 404 as the difference between $v_4$ and the bit-wise permutation of $v_5$ according to $P_1^t$ (see FIG. 3).

Figure 5:
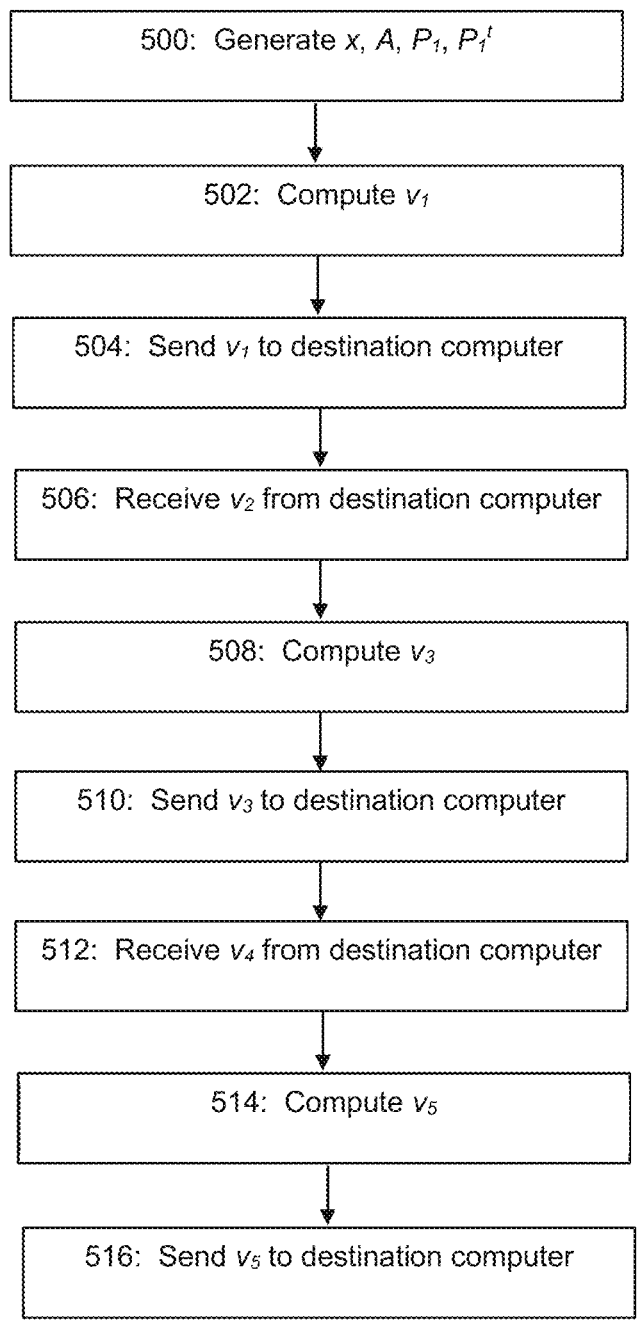
FIG. 5 shows an example process flow for execution by the source computer system when implementing a 5PP approach in accordance with the FIG. 3 embodiment.

FIG. 5 shows an example process flow for execution by the source computer system 402 to implement its operations as part of the 5PP approach of FIG. 3. At step 500, a processor of the source computer system 402 generates the secret data matrix and the parameters A, $P_1$, and $P_1^t$. As noted, the source computer system 402 can randomly generate x, A, and $P_1$. It should be understood that $P_1^t$ need not necessarily be computed at step 500, and some practitioners may choose to wait to compute $P_1{}^t$ until later during the process flow (e.g., between or as part of steps 502-508). Furthermore, it should be understood that the order in which A and $P_1$ are generated is immaterial.

At step 502, a processor of the source computer system 402 computes the matrix $v_1$ using logical operations as shown by FIG. 3 for the first pass. This matrix $v_1$ is then sent to the destination computer system 404 via message 410 (see step 504).

At step 506, the source computer system 402 receives the matrix $v_2$ in message 412 from the destination computer system. At step 508, a processor of the source computer system 402 then uses logical operations as shown by FIG. 3 for the third pass to compute the matrix $v_3$. This matrix $v_3$ is then sent to the destination computer system 404 via message 414 (see step 510).

At step 512, the source computer system 402 receives the matrix $v_4$ in message 416 from the destination computer system. At step 514, a processor of the source computer system 402 then uses logical operations as shown by FIG. 3 for the fifth pass to compute the matrix $v_5$. This matrix $v_5$ is then sent to the destination computer system 404 via message 418 (see step 516).

Figure 6:
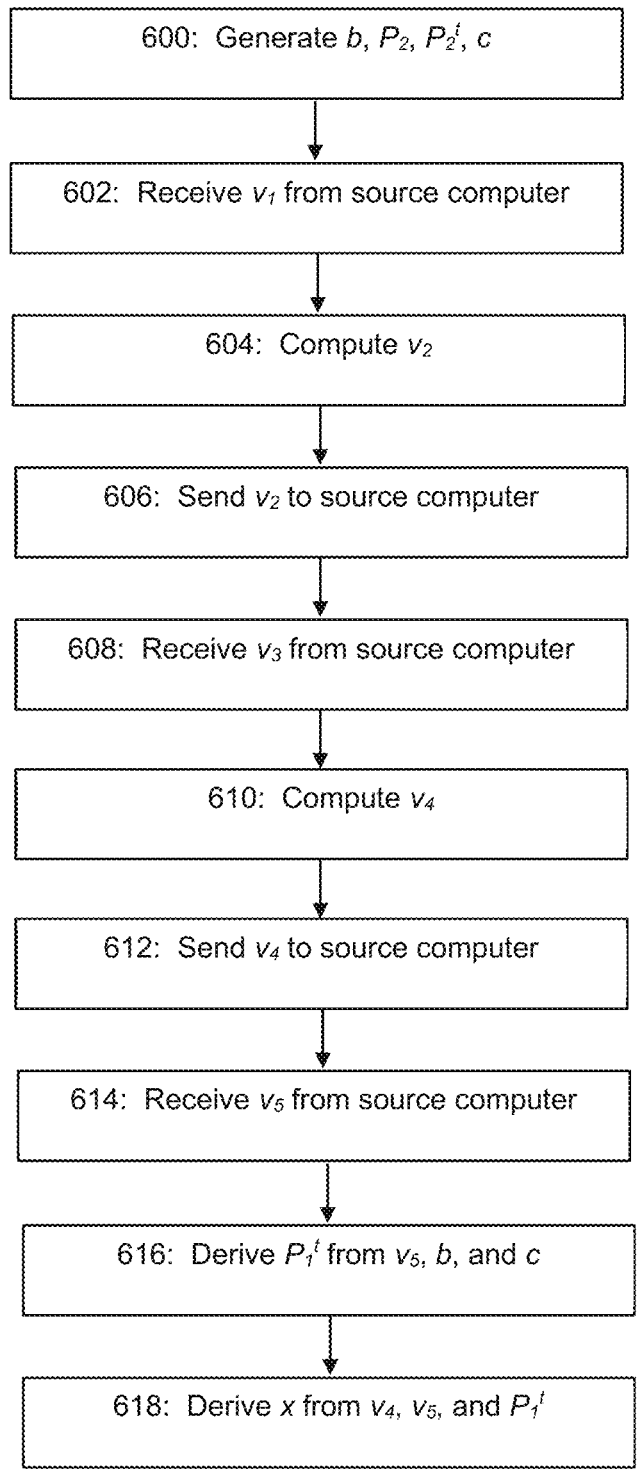
FIG. 6 shows an example process flow for execution by the destination computer system when implementing a 5PP approach in accordance with the FIG. 3 embodiment.

FIG. 6 shows an example process flow for execution by the destination computer system 404 to implement its operations as part of the 5PP approach of FIG. 3. At step 600, a processor of the destination computer system 404 generates the parameters b, $P_2$, and $P_2{}^t$, and c. As noted, the destination computer system 404 can randomly generate b, $P_2$, and $P_2{}^t$, and c. It should be understood that $P_2{}^t$ need not necessarily be computed at step 600, and some practitioners may choose to wait to compute $P_2{}^t$ until later during the process flow (e.g., between or as part of steps 602-610). Similarly, it should be understood that c need not necessarily be generated at step 600, and some practitioners may choose to wait to generate c until later during the process flow (e.g., between or as part of steps 602-610). Furthermore, it should be understood that the order in which b, $P_2$, and c are generated is immaterial. Further still, it should be understood that the destination computer system 404 may potentially perform step 600 before source computer system 402 performs step 500 (and that the source computer system 402 may potentially perform step 500 before destination computer system 404 performs step 600).

Figure 7:
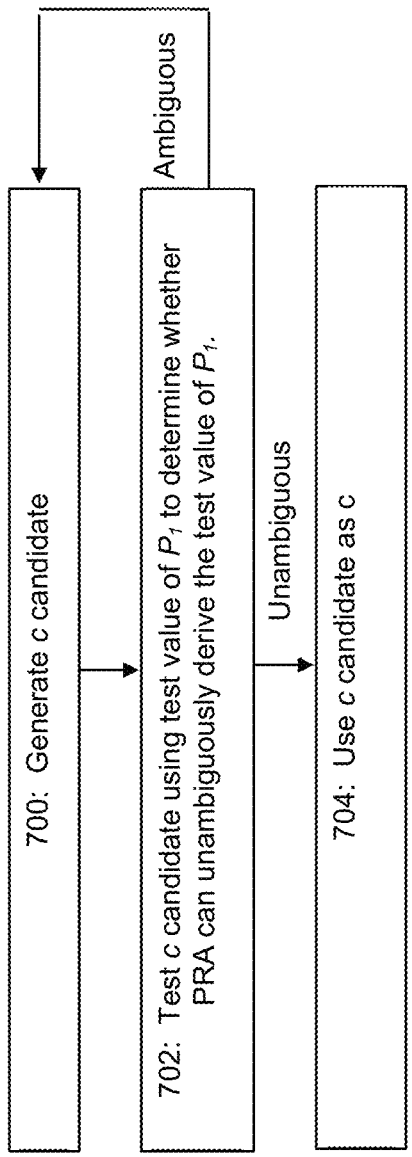
FIG. 7 shows an example process flow for the destination computer system to determine a parameter c to be used with a 5PP approach in accordance with the FIG. 3 embodiment.

The inventors note that the value of c can be evaluated and re-generated if necessary in order to prevent the possibility that the subsequent derivation of $P_1{}^t$ (see step 616 below) will produce an ambiguous result. Accordingly, a practitioner may want to include a process flow as shown by FIG. 7 as part of step 600 in order to reduce the risk of ambiguity in the derivation of $P_1{}^t$. As shown by FIG. 7, at step 700, a processor of the destination computer system 404 randomly generates a candidate for c. At step 702, the processor determines whether the c candidate will lead to an ambiguous permutation recovery with respect to the PRA described in Appendix 1. This test can rely on the observation that if a value of c produces an ambiguous derivation of $P_1$ for any value of $P_1$, it will produce an ambiguous derivation for all values of $P_1$ and likewise if a value of c produces an unambiguous derivation of $P_1$ for a known value of $P_1$, it will produce an unambiguous derivation of $P_1$ for any value of $P_1$. Accordingly, for step 702, a test value of $P_1$ can be arbitrarily chosen, and the PRA of Appendix 1 can be applied to the c candidate and this test value of $P_1$. If this application of the PRA at step 702 yields an unambiguous derivation of the test $P_1$, then a conclusion can be reached that the c candidate will produce an unambiguous derivation of the actual $P_1$ used in the 5PP. Likewise, if this application of the PRA at step 702 yields an ambiguous derivation of the test $P_1$, then a conclusion can be reached that the c candidate will produce an ambiguous derivation of the actual $P_1$ used in the 5PP. While the test $P_1$ can be any arbitrary value for $P_1$, the inventors believe that the use of an identity matrix for the test $P_1$ will provide a simple and efficient manner for testing the c candidate.

Appendix 2 included herewith explains techniques that can be used to compute an approximation to the probability of ambiguity for a c candidate. This determined probability can be used to estimate the frequency of failure that would arise if a process flow like that shown by FIG. 7 were not employed (or similarly, the frequency by which FIG. 7 would need to compute new values for c as discussed below). As explained in Appendix 2, these probabilities are extremely low for relatively large values of m and n (such as 256 and 64 respectively) thereby ensuring that a value of c which produces a unique derivation of $P_1$ can always be found rapidly.

If step 702 results in a determination that the c candidate permits unambiguous derivation of $P_1$, then the destination computer system 404 will use the c candidate as the value for c (step 704). Otherwise, the process flow returns to step 700 where a new c candidate can be generated and evaluated again by step 702.

At step 602, the destination computer system 404 receives the matrix $v_1$ in message 410 from the source computer system. At step 604, a processor of the destination computer system 404 computes the matrix $v_2$ using logical operations as shown by FIG. 3 for the second pass. This matrix $v_2$ is then sent to the source computer system 402 via message 412 (see step 606).

At step 608, the destination computer system 404 receives the matrix $v_3$ in message 414 from the source computer system. At step 610, a processor of the destination computer system 404 then uses logical operations as shown by FIG. 3 for the fourth pass to compute the matrix $v_4$. This matrix $v_4$ is then sent to the source computer system 402 via message 416 (see step 612).

At step 614, the destination computer system 404 receives the matrix $v_5$ in message 418 from the source computer system. At this point, the destination computer system now has the information it needs to derive $P_1$ and $P_1{}^t$.

To derive $P_1$ and $P_1{}^t$, at step 616, a processor of the destination computer system 404 can perform a permutation recovery algorithm (PRA) to derive $P_1$ and $P_1{}^t$. An example PRA to derive the value for $P_1$ is described in Appendix 1. As noted above, this computation will always produce a unique result if the procedure described in FIG. 7 is followed. Once $P_1$ has been derived, the transpose of $P_1$ can be readily computed to thereby derive $P_1{}^t$.

If a practitioner chose not to implement the procedure of FIG. 7 to guarantee a value for c that will produce an unambiguously derived $P_1$, it is possible that the PRA will produce ambiguity in the derivation of P1 at step 616. That is, the PRA may not resolve to a single value for the derived $P_1$. If this ambiguity results at step 616, the destination computer system 404 can halt the protocol and notify the source computer system 402 of this error. In such an event, the source computer system 402 can restart the five-pass protocol from the beginning (or the process flow can go back to the fourth pass computation of $v_4$ using a new value of c). With the re-started process, the values of one or more of the private parameters can be changed by the source computer system 402 and/or the destination computer system 404, although it is preferred that the re-started 5PP regenerate all of the private parameters to more reliably ensure security. The likelihood of consecutive derivations of $P_1$ leading to an ambiguous result will be exceedingly small. But, as noted, if the procedure of FIG. 7 is employed, there would be no need for this type of exception handling.

Once $P_1$ and $P_1t$ have been unambiguously derived at step 616, the process flow can proceed to step 618. At step 618, a processor of the destination computer system 404 derives the secret data matrix x by computing the value for x based on $v_4$, $v_5$, and $P_1'$ as shown by FIG. 3. The destination computer system 404 then knows the secret data matrix x. At this point, the destination computer system 404 can send a message to the source computer system 402 acknowledging that it was able to successfully derive the secret data matrix x.

After the destination computer system 404 has successfully derived the secret data matrix x, x can then be used by the destination computer system 404 as a basis to derive a key, such as a random symmetric key, to be used for encryption operations. Similarly, the source computer system 402 can also use x to derive a key, to be used for decryption operations. Any of a number of techniques can be used to derive a key from x. For example, x itself can be used as the key. As another example, a defined subset of bits within x can be used as the key. As yet another example, a logical operation such as a hashing function can be applied to x to generate the key. The source and destination computer systems 402, 404 can employ the same key generation techniques for deriving the key from x. The message acknowledging the success in the sharing of the secret x may also contain one or more keys to be used for symmetric encryptions and decryption of a future message. These additional keys would be encrypted with the key derived from the secret x. Accordingly, the system 400 of FIGS. 4A and 4B can be put to beneficial use by both the operator of the source computer system 402 and the operator of the destination computer system 404 because the system 400 provides a mechanism for both operators to securely communicate with each other. That is, based on the generated keys, the source and destination computer systems 402 and 404 can communicate data to each other in encrypted formats; and the keys can be used to decrypt the encrypted data at the receiving end. For example, the source and destination computer systems 402,404 can take the form of computers that operate websites and browsers where HTTP data is exchanged. The 5PP approach to key exchange can then be used to support the encryption/decryption of such HTTP-based data exchanges. Accordingly, it should be understood that the 5PP approaches described herein can be used to replace existing key exchange techniques that underlie Hypertext Transfer Protocol Secure (HTTPS) security.

Beyond just HTTPS, the inventors believe that the 5PP approaches described herein can be used as the basis for secure key exchange in any system that employs Public Key Infrastructure (PKI).

Practitioners can choose how frequently the source and destination computers 402,404 will perform the 5PP with respect to new secret data matrices in order to generate new keys. For example, the key exchange can be performed at the time of installation of new endpoint equipment in a network and only rarely thereafter whenever there are equipment or network failures. However, in a web traffic context, new key exchange can happen each time there is a new session between a browser and a new server. This is likely to occur only every few minutes (whereas the 5PP can be implemented within milliseconds).

Another use of the 5PP involves the registration of the security devices such as the Q-Net I/O (QIO) units marketed by Q-Net Security. Registration is the process of sharing a secret that enables the sharing of keys between a QIO unit and a Q-Net Policy Manager (QPM). In applications involving a few QIO units, it is possible to register them all with the QPM at a single secure location. However, if there are a large number of QIO units such a procedure becomes logistically problematic. As a more flexible procedure, a small handheld device capable of executing the 5PP can perform the registration function even in insecure locations (e.g., outside of a secure environment for the QPM) while making eavesdropping-based attacks on security computationally infeasible (as discussed below).

It should also be understood that the secret data matrix x need not be limited to use for supporting key generation. The secret data matrix x could be any type of data matrix that a practitioner wants to transfer between source and destination in an encrypted format for decryption at the destination.

While the example 5PP of FIG. 3 shows the use of modular addition and subtraction operations as reversible logic operations at various stages of the 5PP, it should be understood that other reversible logic operations could be employed, examples of which are discussed above. For example, the addition and subtraction operations could be replaced by XOR operations.

As noted above, the source and destination computer systems 402,404 can implement the logic for carrying out the 5 stages of operations shown in the example of FIG. 3 using software and/or hardware. For example, software in the form of a plurality of instructions executable by a processor of the source computer system 402 and/or a processor of the destination computer system 404 can be used to carry out the operations of FIG. 3. However, for improved performance, these operations could also be implemented in hardware logic, such as state machine-controlled hardware logic, rather than in stored program-enabled software logic. By hardwiring a hardware logic circuit to carry out the logical operations, massive parallelism can be applied to the bit operations to further improve performance. As examples, hardware such as ASICs and/or FPGAs could be used as the resource for a hardware implementation of the logical operations shown by FIG. 3. As another option, GPUs could be used as the compute resource for carrying out the logical operations of FIG. 3. The computational complexity needed by the source and destination computer systems 402,404 is quite modest (e.g., modular addition/subtraction and permutations) except for the destination's recovery of $P_1$ from knowledge of c and $P_1 \cdot c$. But, the O(m·n) algorithm described in Appendix 1 for the PRA is not particularly onerous since it is comparable in complexity to the transmission of the m·n bits that make up each of the five passes. Also notable is the ease of computation for the XOR operations. On most processors, only a single instruction is required for the XOR operation on two machine words. For software implementations, perhaps a handful of such instructions would be required for the 2m bits of two five-pass words. In hardware implementations, the XOR operation for all m bits of the n words (m×n bits) can take place in a single clock cycle.

Furthermore, while FIGS. 5 and 6 show example process flows for execution by the source and destination computer systems respectively, it should be understood that a practitioner may want to configure a computer system to be capable of playing the role of both a source and a destination based on the context of its situation at a given time. Accordingly, a computer system can be configured to carry out the process flows of both FIGS. 5 and 6, where the computer system can selectively switch between the FIG. 5 process flow and the FIG. 6 process flow based whether it is playing a role as a source or destination.

Moreover, it should be understood that the source computer system 402 and/or the destination computer system 404 could perform its role in the 5PP as a service on behalf of one or more other computer systems. For example, performing 5PP as a service can be done where the providing computer is in confidential communication with its client, e.g., where it has already established a shared secret for confidential communication between provider and client.

Resistance to Attacks:

We will now elaborate on the difficulty of breaching the 5PP approach of FIG. 3 using brute force attacks. However, before diving into this issue, there are several issues worth noting:

The validity of the third-pass matrix operation: $P_1'(P_1x+b)=x+P_1'b$ (see FIG. 3)

Limitation of arithmetic operations to m-bits per word

The validity of the third-pass matrix operation and the limitation on arithmetic operations are tied together. With no limit on the number of bits representing the variables in the third pass, the matrix operation is clearly valid. However, there should be a limit on the number of bits to be transmitted. For calculations modulo k, where m/k is a positive integer, it can easily be shown that, $$\text{Mod}_k[P_1'(P_1x+b)]=\text{Mod}_k[x+P_1'b]$$

In particular for k=m, all such modular computations will never require more than m bits. For cases where m is an even number, the addition becomes an exclusive-or operation (XOR).

With respect to possible attacks, since at least two parameters are changed on each pass, it is not possible for an eavesdropper to discover a parameter by comparing two consecutive passes. However, guessing any one of the private parameters, $P_1$, $P_2$, A, b, c, is sufficient to allow the eavesdropper to discover x. The private parameters b and c are more difficult to guess since each has n random, m-bit values as does the secret x. The expected number of guesses required is shown in the table below.

| Parameter | Number of Guesses |
| --- | --- |
| $P_1$ | m! |
| $P_2$ | n! |
| A | $2^m$ |
| b, c, x | $2^{m \cdot n}$ |

If we choose m=256 and n=64, the eavesdropper will typically require $2^{256}$ guesses for A and about $2^{296}$ guesses (which approximates 64!) for $P_2$. This is an effort that is comparable or greater than that required to break AES 256. Attempting to guess A seems the best course for the eavesdropper since knowledge of a single parameter is all that is required to breach the encryption (as compared to the other parameters which would require significantly more guesses). But as noted, A is still highly resistant to brute force attacks at a level comparable to AES 256. As such, the 5PP approach of FIG. 3 is believed to be highly secure against brute force attacks. Considering the number of guesses required one can see that attempting to guess any other parameter would require more effort.

The PQC methods advanced so far (such as SIDH and RLWE), rely upon mathematically hard problems that have no known efficient algorithmic solution. This is analogous to the situation three decades ago when RSA was introduced: there was no known efficient algorithm for factoring large integers. In contrast, 5PP depends on numerical complexity requiring an attacker to use brute force to discover the secret. In certain applications there are, however, several burdens that a 5PP user must bear:

A practitioner may conclude that the length of time to complete the five-pass protocol may be too long.

A practitioner may find that using 5PP in channels limited to low link-rates is overly tedious.

Like PKI, 5PP is at risk with respect to Man-in-the-Middle (MITM) attacks.

The widespread availability of broadband service diminishes these first two burdens. Consider two examples of the use of the 5PP of FIG. 3, one operating over a 100 Mb/s link and the other over a 1 Gb/s link. The table below indicates total time that would elapse over a link with a 1 ms roundtrip time including the time required for both computation, data transfer and 2.5 ms for 2.5 roundtrips.

| | Words per Pass | Bits per Word | Time per Pass | Five Passes | 2.5 Roundtrips | Total Time |
| --- | --- | --- | --- | --- | --- | --- |
| 100 Mb/s | 64 | 256 | 164 μs | 820 μs | 2.5 ms | 3.32 ms |
| 1 Gb/s | 64 | 256 | 16.4 μs | 82 μs | 2.5 ms | 2.58 ms |

Clearly, the roundtrip time is the dominating component of the total time for the covert transmission of a secret at the two data rates shown above. Lower speed links will take longer, of course, but such links will become less common in the future. Furthermore, custom hardware as discussed above can assure that 5PP computations do not compromise performance.

To mitigate the risks arising from MITM attacks, certificate authorities and/or multi-factor authentication can be employed. For example, the 5PP approaches described herein may be combined with a Certificate of Authority (CA) that authenticates each party's identities. As another example, the 5PP approaches described herein may be combined with multi-factor authentication (MFA) where out-of-band communications are used to provide an additional channel for verifying each party's identity.

The 5PP approaches as described herein has several advantages over other quantum-resistant approaches.

Computational complexity for 5PP is substantially lower than elliptic-curve methods For the 5PP approach of FIG. 3, the computations only need five O(m·n) XOR operations and the O(m·n) PRA Future quantum algorithms are unlikely to provide an effective attack on 5PP 5PP word-size grows only linearly with quantum-computer qubit size Grover's algorithm (see Wikipedia, "Grover's Algorithm", edit date Nov. 13, 2019) is ineffective with a 256 qubit size and $O(2^{128})$ complexity The 5PP approach is sufficiently transparent to allow rapid identification of weaknesses The individual computations for 5PP are fast and easy to understand Quantum key distribution (QKD) methods are, safe but more limited than 5PP QKD networks are expensive, distance-limited, and have data rates under 1 Mbps Total time taken for the 5PP approach is believed to often be less than for competing approaches This is particularly important for Internet of Things (IoT) endpoints with limited computational power Independent random numbers can be used for each instance of the 5PP approach As a result, replay and other classic attacks can be blocked In summary, the 5PP approaches for cryptographic data exchange is quite different than other proposed post-quantum algorithms. For example, 5PP depends on numerical complexity instead of computational complexity to obscure the secret passed from source to destination. Furthermore, future discovery of applicable quantum-computer algorithms is unlikely to threaten 5PP. The effort required by an attacker using a classical computer is $O(2^{256})$ and is hypothesized to be $O(2^{128})$ for future 256-qubit quantum computers. Also, the time to execute 5PP is comparable to network roundtrip times when high-speed links are used.

Figure 12:
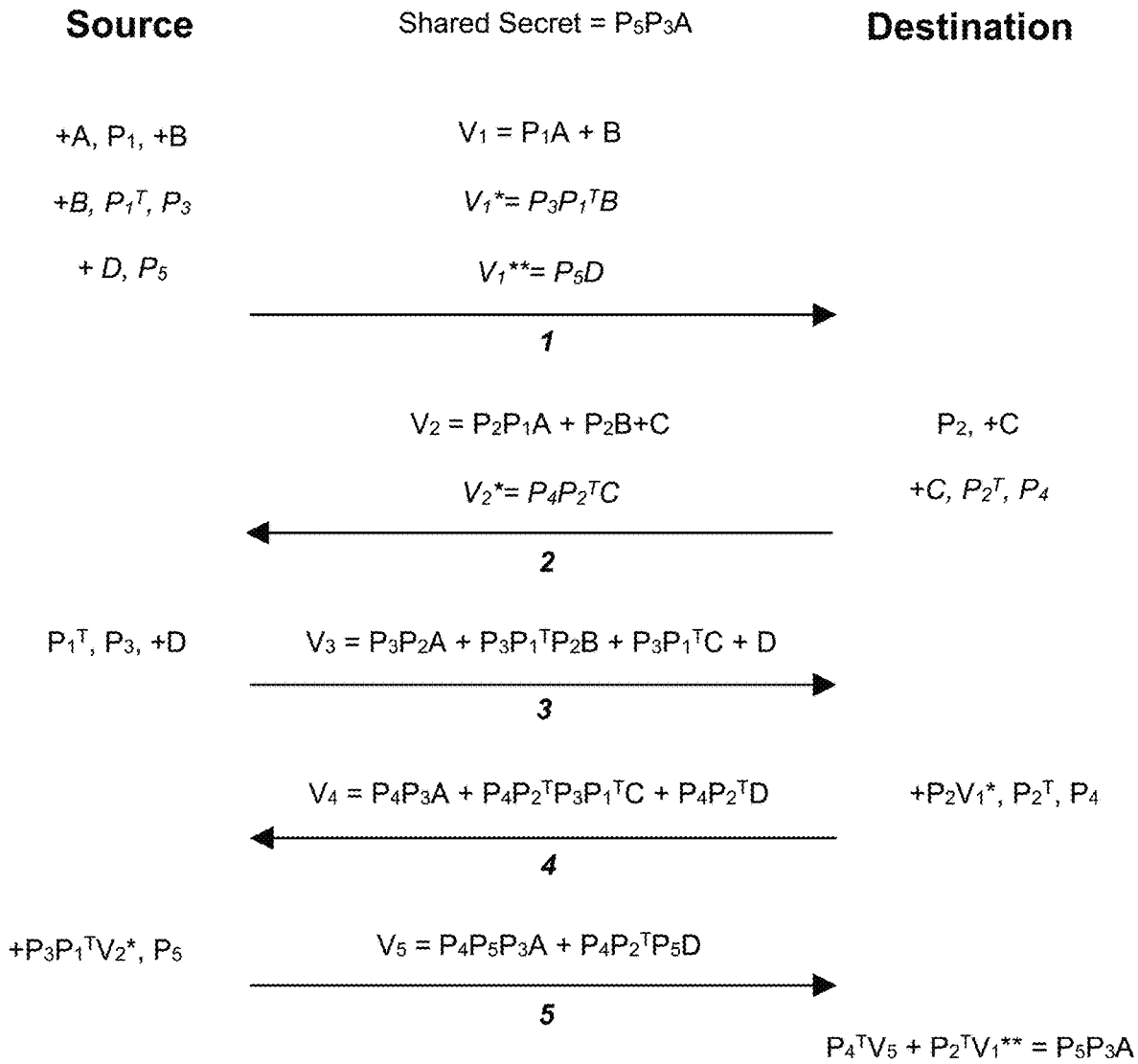
FIG. 12 shows another example five-pass protocol (5PP) for securely exchanging a secret data matrix between a source computer system and a destination computer system.

Second Example 5PP Embodiment (FIG. 12)

FIG. 12 shows another example 5PP approach for securely exchanging a secret data matrix between a source computer system and a destination computer system. While the 5PP approach of FIG. 3 uses a series of 5 messages over 5 passes to securely exchange the secret data matrix, the 5PP approach of FIG. 12 uses a series of 8 messages over 5 or more passes. Also, while the 5PP approach of FIG. 3 uses a secret data matrix x that is effectively its own independent parameter, the 5PP approach uses a secret data matrix that is a combination of a plurality of the source computer system's parameters. In the example of FIG. 12, the secret data matrix is computed from 3 of the source computer system's parameters as $P_5 P_3 A$. This FIG. 12 approach to expressing the secret data matrix is believed to better enhance the security of 5PP by effectively burying the secret data matrix more deeply within the message exchanges. The 5PP of FIG. 12 obscures a secret data matrix using 9 private parameters, of which 6 parameters (A, B, D, $P_1$, $P_3$, and $P_5$) are known by the source computer system but not shared in unobscured form with the destination computer system, and of which 3 parameters (C, $P_2$, and $P_4$) are known by the destination computer system but not shared in unobscured form with the source computer system. Each pass is shown in FIG. 12 by an arrow between the source and destination, and the sequence of passes is numbered 1 through 5 by FIG. 12.

The example 5PP embodiment of FIG. 12 can be implemented using a networked system 400 as discussed above in connection with FIGS. 4A and 4B, albeit where the message exchanges can include 3 additional messages ($V_1^*$, $V_1^{**}$, and $V_2^*$ as discussed below). As discussed above, the source and/or destination computer systems may leverage compute resources such as FPGAs, ASICs, GPUs, and the like to accelerate their processing operations.

FIG. 12 shows the different messages ($V_1$, $V_1^{**}$, $V_2$, $V_2^*$, $V_3$, $V_4$, and $V_5$) that are sent between the source and destination for each pass, where each message V can take the form of an X by X matrix. While the 5PP approach of FIG. 12 requires the computer systems to communicate $V_1$-$V_5$ in sequence (as the destination computer system needs to have $V_1$ before it can compute $V_2$, the source computer system needs to have $V_2$ before it can compute $V_3$, and so on), it should be understood that there is some flexibility with respect to when the additional messages $V_1^*$, $V_1^{**}$, and $V_2^*$ are communicated over the network. For example, $V_1^*$ is needed for the destination computer system to compute $V_4$, which means that $V_1^*$ can be generated and communicated by the source computer system as part of the first or third passes (or even in a separate pass that occurs before what is shown as the fourth pass by FIG. 12). As another example, $V_1^{}$ is needed for the destination computer system to compute the secret data matrix after the fifth pass, which means that $V_1^{}$ can be generated and communicated by the source computer system as part of the first, third, or fifth passes (or even in a separate pass that occurs before the destination computer system computes the secret data matrix after what is shown as the fifth pass by FIG. 12). As yet another example, $V_2^*$ is needed for the source computer system to compute $V_5$, which means that $V_2^*$ can be generated and communicated by the destination computer system as part of the second or fourth passes (or even in a separate pass that occurs before what is shown as the fifth pass by FIG. 12).

In each pass, FIG. 12 shows that obscuration of the secret data matrix can be provided over the series of five passes via reversible logic operations such as permutations and modulo additions. Thus, with FIG. 12, the confidentiality of each pass is protected by both a permutation and a modulo addition. The modulo 2 additions can be implemented as XOR operations. In an example embodiment, additions shown by FIG. 12 can be modulo 2 additions. However, this need not be the case (for example straight additions/subtractions could be employed if desired by a practitioner).

The parameters A, B, C, and D shown by FIG. 12 can be X by X matrices populated with random values. Accordingly, these can be referred to as variable matrices.

The parameters $P_1$, $P_3$, and $P_5$ shown by FIG. 12 can be X by X matrices that operate to change the order of the columns of a variable matrix. The parameters $P_2$ and $P_4$ shown by FIG. 12 can be X by X matrices that operate to change the order of the rows of a variable matrix. Accordingly, these matrices $P_1$, $P_2$, $P_3$, $P_4$ and $P_5$ can be referred to as permutation matrices. A permutation matrix is a matrix where each row has only one entry of "1" (and all other entries in that row are "0") and where each column has only one entry of "1" (and all other entries in that column are "0"). Whether a given permutation matrix operates as a column-wise permutation matrix or a row-wise permutation matrix on the subject matrix with which it is combined will depend on the order of multiplication for the two matrices. That is multiplying permutation matrix P by variable matrix A in the order of PA would produce row-wise permutation of A. By contrast, multiplying permutation matrix P by variable matrix A in the order of AP would produce column-wise permutation of A. The nature of the column permutation and row permutation within the permutation matrices can be randomized" through randomization of where the "1"s are located in each permutation matrix. The secret data matrix can be an X by X matrix that is computed as $P_5 P_3 A$. Accordingly, the secret data matrix can be the variable matrix A as permuted by the (columnar) permutation matrices $P_3$ and $P_5$. The value of X can be defined by a practitioner to be a number of bits that balances security versus computation time/efficiency. Setting the value of X low will sacrifice security (e.g., making the cryptography more susceptible to cracking) while setting the value of X high would increase the computation time and resources required for the Practitioners can choose to balance these competing interests in a manner deemed appropriate for their particular use cases, but the inventors note that a value of X=64 bits can provide a nice balance of security and computational time/efficiency. However, it should be understood that other values for X could be employed (for example, 128 bits, 256 bits, 512 bits, 1024 bits, or even higher if desired by a practitioner).

The source computer system 402 can randomly generate the parameters A, B, D, $P_1$, $P_3$, and $P_5$. The source computer system 402 can also compute the transpose of $(P_1^T)$ after $P_1$ has been generated. Like $P_1$, the source computer system 402 will not share $P_1^T$ with the destination computer system 404 in unobscured form. Furthermore, the destination computer system 404 can randomly generate the parameters C, $P_2$, and $P_4$). The destination computer system 404 can also (1) compute the transpose of $P_2$ $(P_2^T)$ after $P_2$ has been generated and (2) compute the transpose of $P_4$ $(P_4^T)$ after $P_4$ has been generated. Like $P_2$ and $P_4$, the destination computer system 404 will not share $P_2^T$ or $P_4^T$ with the source computer system 402 in unobscured form.

With reference to FIG. 12, the source computer system 400 can compute $V_1$ by (1) column-wise permuting A according to $P_1$ to yield a column-wise permutation of A, and (2) then adding B to the column-wise permutation of A. FIG. 12 shows an example formula for computing Vi in this fashion.

The source computer system can also compute the additional messages $V_1^*$ and $V_1^{**}$ using the formulas shown by FIG. 12. $V_1^*$ can be computed by (1) column-wise permuting B according to $P1^T$, and (2) then column-wise permuting $P_1^T B$ according to $P_3$. $V_1^{**}$ can be computed by column-wise permuting D according to $P_5$.

After $V_1$ has been communicated to the destination computer system 404 via message 410, the destination computer system can extract $V_1$ from this message and compute $V_2$ by (1) row-wise permuting $V_1$ according to $P_2$, and (2) then adding C to this row-wise permutation of $V_1$. FIG. 12 shows an example formula for computing $V_2$ in this fashion in terms of its constituent parameters. The destination computer system can also compute the additional message $V_2^*$ using the formula shown by FIG. 12. $V_2^*$ can be computed by (1) row-wise permuting C according to $P_2^T$, and (2) then row-wise permuting $P_2^T C$ according to $P_4$.

After $V_2$ has been communicated to the source computer system 402 via message 412, the source computer system can extract $V_2$ from this message and compute $V_3$ by (1) column-wise permuting $V_2$ according to $P_1^T$, (2) then column-wise permuting $P_1^T V_2$ according to $P_3$, and (3) then adding D to $P_3 P1^T V_2$. FIG. 12 shows an example formula for computing $V_3$ in this fashion in terms of its constituent parameters.

After $V_3$ has been communicated to the destination computer system 404 via message 414 and $V_1^*$ has been communicated to the destination computer system (via message 410 or 414 (or via its own message)), the destination computer system can extract Wand $V_3$ from the message(s) and compute $V_4$ by (1) row-wise permuting $V_1^*$ according to $P_2$, (2) then adding this sum to $V_3$, (3) then row-wise permuting this sum according to $P_2 T$, and (4) then row-wise permuting this row-wise permutation according to $P_4$, FIG. 12 shows an example formula for computing $V_4$ in this fashion in terms of its constituent parameters.

After $V_4$ has been communicated to the source computer system 402 via message 416 and $V_2^*$ has been communicated to the source computer system (via message 412 or 416 (or via its own message)), the source computer system can extract $V_2^*$ and $V_4$ from the message(s) and compute $V_5$ by (1) column-wise permuting $V_2^*$ according to $P_1$ T, (2) then column-wise permuting $P_1^T V_2^*$ according to $P_3$, (3) then adding $P_3 P_1^T V_2^*$ to $V_3$, and (4) then column-wise permuting this sum according to $P_5$, FIG. 12 shows an example formula for computing $V_5$ in this fashion in terms of its constituent parameters.

After $V_5$ has been communicated to the destination computer system 404 via message 418 and $V_1^{}$ has been communicated to the destination computer system (via message 410, 414, or 418 (or via its own message)), the destination computer system can extract $V_1^{}$ and $V_5$ from the message(s) and it will then have the information it needs to derive the secret data matrix. To do so, the destination computer system 404 can derive the secret data matrix (now the shared secret data matrix) according to the formula shown by FIG. 12. That is, by (1) row-wise permuting $V_5$ according to $P_4 T$, (2) row-wise permuting $V_1^{}$ according to $P_2^T$, and (3) summing $P_4^T V_5$ with $P_2^T V_1^{}$, the destination computer system is able to derive the shared secret matrix $P_5 P_3 A$. It should be understood that this example formula for computing the shared secret matrix is for when the system is employing modulo 2 addition (where addition of equivalent matrices operates to produce a zero value). If the system employs straight addition, then the computation of the secret data matrix could be expressed as $P_5 P_3 A = P_4^T V_5 - P_2^T V_1^{**}$.

Figure 13:
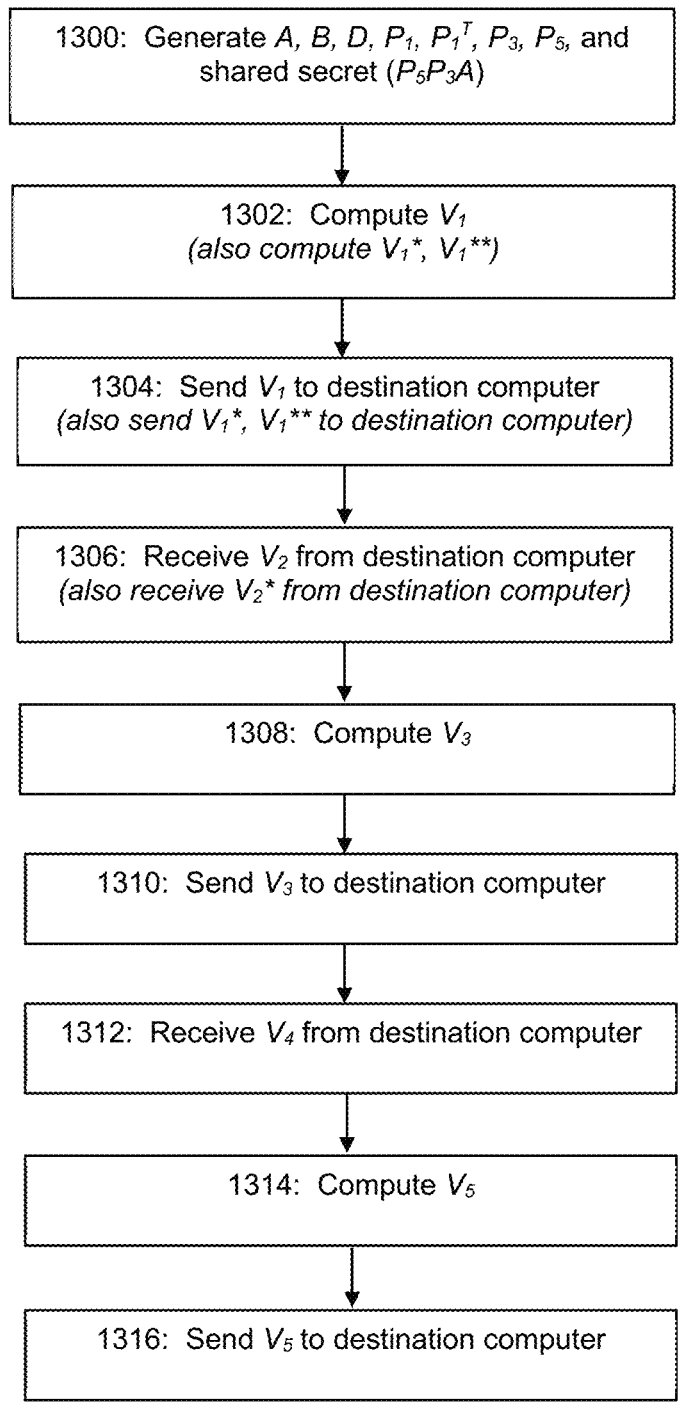
FIG. 13 shows an example process flow for execution by the source computer system when implementing a 5PP approach in accordance with the FIG. 12 embodiment.

FIG. 13 shows an example process flow for execution by the source cor system 402 to implement its operations as part of the 5PP approach of FIG. 12. At step 1300, a processor of the source computer system 402 generates the parameters A, B, D, $P_1$, $P_1^T$, $P_3$, and $P_5$ and the secret data matrix $(P_5 P_3 A)$ As noted, the source computer system 402 can randomly generate A, B, D, $P_1$, $P_3$, and $P_5$. It should be understood that $P_1^T$ need not necessarily be computed at step 1300, and some practitioners may choose to wait to compute $P_1^T$ until later during the process flow (e.g., between or as part of steps 1302-1308). Similarly, other parameters could be generated later in the process flow (e.g., just before they are needed in the message computations). Furthermore, it should be understood that the order in which the randomized parameters are generated is immaterial.

At step 1302, a processor of the source computer system 402 computes the matrix $V_1$ using logical operations as shown by FIG. 12 for the first pass. The processor may also generate $V_1^*$ and $V_1^{**}$ at step 1302, although it should be understood that this need not be the case as discussed above. This matrix $V_1$ is sent to the destination computer system 404 via message 410 (see step 1304). This message 410 may also include $V_1^*$ and/or $V_1^{**}$, although it should be understood that $V_1^*$ and/or $V_1^{**}$ could be sent later during the process flow as discussed above if desired. At step 1306, the source computer system 402 receives the matrix $V_2$ in message 412 from the destination computer system. This message 412 may also include $V_2^*$ (although the destination computer system may send $V_2^*$ in subsequent messages if desired, as discussed above). At step 1308, a processor of the source computer system 402 then uses logical operations as shown by FIG. 12 for the third pass to compute the matrix $V_3$. This matrix $V_3$ is then sent to the destination computer system 404 via message 414 (see step 1310).

At step 1312, the source computer system 402 receives the matrix $V_4$ in message 416 from the destination computer system. At step 1314, a processor of the source computer system 402 then uses logical operations as shown by FIG. 12 for the fifth pass to compute the matrix $V_5$. This matrix $V_5$ is then sent to the destination computer system 404 via message 418 (see step 1316).

Figure 14:
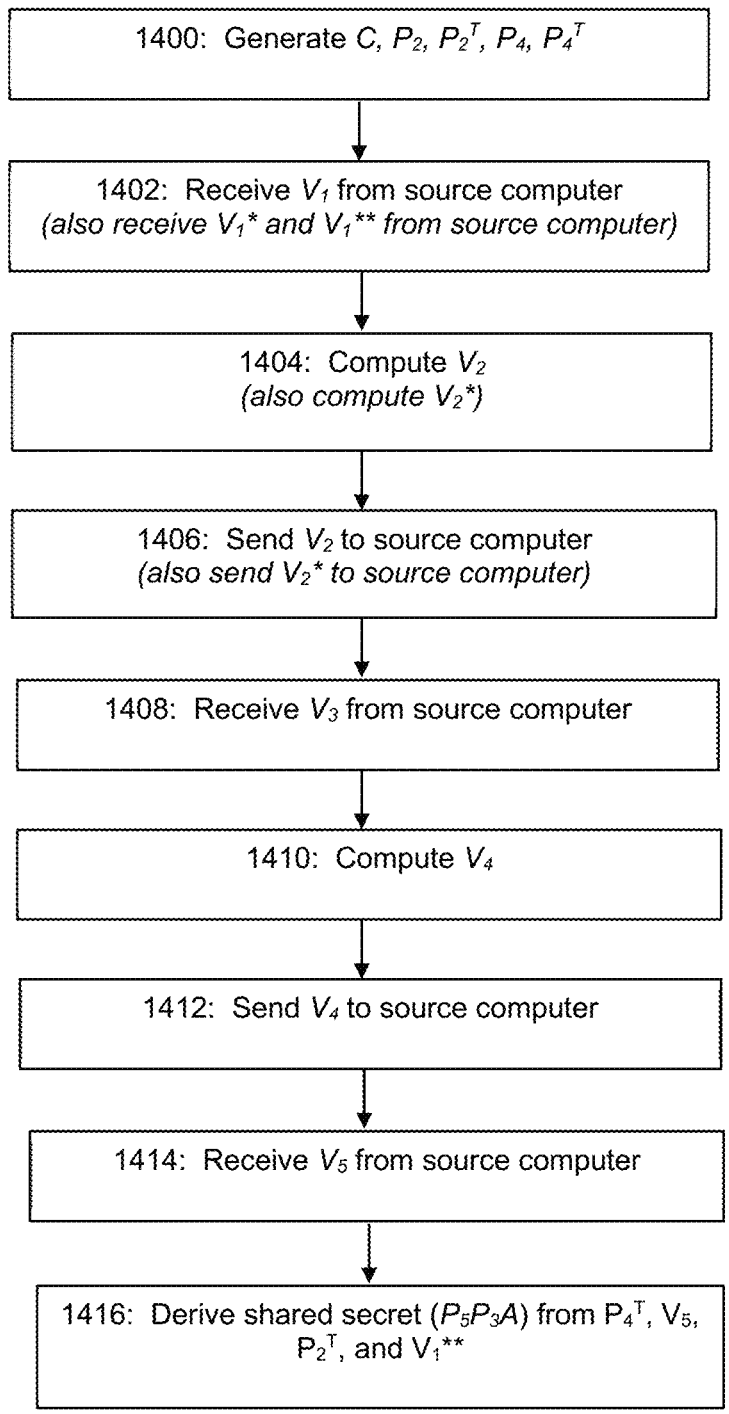
FIG. 14 shows an example process flow for execution by the destination computer system when implementing a 5PP approach in accordance with the FIG. 12 embodiment.

FIG. 14 shows an example process flow for execution by the destination computer system 404 to implement its operations as part of the 5PP approach of FIG. 12. At step 1400, a processor of the destination computer system 404 generates the parameters C, $P_2$, $P_2^T$, $P_4$, and $P_4^T$. As noted, the destination computer system 404 can randomly generate C, $P_2$, and $P_4$. It should be understood that $P_2^T$ and $P_4^T$ need not necessarily be computed at step 1400, and some practitioners may choose to wait to compute $P_2^T$ and/or $P_4^T$ until later during the process flow (e.g., between or as part of steps 1402-1410). Similarly, other parameters could be generated later in the process flow (e.g., just before they are needed in the message computations). Furthermore, it should be understood that the order in which the randomized parameters are generated is immaterial. Further still, it should be understood that the destination computer system 404 may potentially perform step 1400 before source computer system 402 performs step 1300 (and that the source computer system 402 may potentially perform step 1300 before destination computer system 404 performs step 1400).

At step 1402, the destination computer system 404 receives the matrix $V_1$ in message 410 from the source computer system. This message may also include the matrices $V_1^*$ and $V_1^{}$ as discussed above. At step 1404, a processor of the destination computer system 404 computes the matrix $V_2$ using logical operations as shown by FIG. 12** for the second pass. The processor may also generate $V_2^*$ at step 1404, although it should be understood that this need not be the case as discussed above. The matrix $V_2$ is sent to the source computer system 402 via message 412 (see step 1406). This message 412 may also include $V_2^*$, although it should be understood that $V_2^*$ could be sent later during the process flow as discussed above if desired.

At step 1408, the destination computer system 404 receives the matrix $V_3$ in message 414 from the source computer system. At step 1410, a processor of the destination computer system 404 then uses logical operations as shown by FIG. 12 for the fourth pass to compute the matrix $V_4$. This matrix $V_4$ is then sent to the source computer system 402 via message 416 (see step 1412).

At step 1414, the destination computer system 404 receives the matrix $V_5$ in message 418 from the source computer system. At this point, the destination computer system now has the information it needs to derive the secret data matrix, and the process flow can proceed to step 1416. At step 1416, a processor of the destination computer system 404 derives the secret data matrix as shown by FIG. 12. At this point, the destination computer system 404 can send a message to the source computer system 402 acknowledging that it was able to successfully derive the secret data matrix.

As discussed above in connection with the FIG. 3 embodiment, after the destination computer system 404 has successfully derived the secret data matrix, the secret data matrix can then be used by the destination computer system 404 as a basis to derive a key, such as a random symmetric key, to be used for encryption operations. Similarly, the source computer system 402 can also use the secret data matrix to derive a key, to be used for decryption operations. Further still, as noted above in connection with the FIG. 3 embodiment, the 5PP approach of FIG. 12 can be used to support the registration of the security devices such as the Q-Net I/O (QIO) units marketed by Q-Net Security, where the registration can include a process of sharing a secret that enables the sharing of keys between a QIO unit and a Q-Net Policy Manager (QPM).

Moreover, as with the 5PP approach of FIG. 3, with the 5PP approach of FIG. 12, practitioners can choose how frequently the source and destination computers 402,404 will perform the 5PP with respect to new secret data matrices in order to generate new keys.

While the invention has been described above in relation to its example embodiments, various modifications may be made thereto that still fall within the invention's scope. Such modifications to the invention will be recognizable upon review of the teachings herein.

APPENDIX 1—PERMUTATION RECOVERY ALGORITHM (PRA)

FIG. 10 shows example pseudocode for operational steps that reveal the permutation $P_1$ when the destination computer system 404 has knowledge of c and $P_1 c \triangleq d$. Assume there are m bits in each of the n words of these two known quantities, $c=\{c_1, c_2, \ldots c_n\}$ and $d=\{d_1, d_2, \ldots d_n\}$. Let $c_i=\{c_{i1}, c_{i2}, \ldots c_{im}\}$ and $d_i=\{d_{i1}, d_{i2}, \ldots d_{im}\}$ where $c_{ij}=0$ or 1 and $d_{ij}=0$ or 1. Let $\oplus$ represent the XOR operation and define the following XOR operation, $$\overline{d_{ij}} \oplus c_i \neg \{\overline{d_{ij}} \oplus c_{i1}, \overline{d_{ij}} \oplus c_{i2}, \ldots \overline{d_{ij}} \oplus c_{im}\}$$

In this instance, the complexity of the PRA of FIG. 10 is thus $O(n \cdot m)$. If the eavesdropper has knowledge of c and $P_1 \cdot c$, the computational complexity of the PRA is insufficient to deter the discovery of the permutation $P_1$ and the subsequent discovery of x. However, as noted, c is a private parameter known only to the destination computer system, and $P_1 \cdot c$ is sent to the Destination in ciphertext (within the matrix v5).

As noted above, it is possible for the PRA to return ambiguous results for derivations of $P_1$. FIG. 11A shows an example of values for c and d that return an unambiguous derivation, and FIG. 11B shows an example of values for c and d that return an ambiguous derivation. For both of these examples, m=4 and n=4. Row 1100 in FIGS. 11A and 11B show summations from a recovery table, and the locations of the value "4" in the vectors of row 1100 identify the bit positions of the "1"/"true" values in each row of the recovered $P_1$. If each vector has only a single value "4", then the $P_1$ derivation is unambiguous. However, if one of the vectors has multiple instances of "4", then the P1 derivation is unambiguous. It should be understood that the use of "4" in this instance arises from the use of m=4. For other implementations where m equals a value q, it should be understood that the value q is what would govern the identification of bit positions for "1"/"true" values in $P_1$.

With FIG. 11A, the recovery table gives G={1,3, 2, 4}, a unique result correctly identifying the permutation $P_1$ as shown by FIG. 11A. With knowledge of derived $P_1$, the computation of derived $P_1'$ is straightforward (see FIG. 11A).

FIG. 11B shows an example with a slight variation in c, but which produces an ambiguous derivations. In the example shown in FIG. 11B, the recovery table will yield a different G={1, {3,4}, 2, {3,4}}, an ambiguous result. The PRA could yield G={1,3, 2,4} or G'={1,4,2,3}, permutations which when expressed in matrix from give, $$P_i = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \text{ or } P_1' = \begin{bmatrix} 1 & 0 & 0 & 0 \\ 0 & 0 & 0 & 1 \\ 0 & 1 & 0 & 0 \\ 0 & 0 & 1 & 0 \end{bmatrix}$$

APPENDIX 2—DEVELOPMENT AND ANALYSIS OF PERMUTATION FORMULA FOR IDENTIFYING PROBABILITY OF AMBIGUITY IN PERMUTATION RECOVERY

The permutation formula is quite complex, so it is useful to review some properties of permutations and how they can manipulate the values of $c \neg \{c_1, c_2, \ldots c_n\}$.

PRA Ambiguity.

Consider an arbitrary permutation $P_{1a}$ that is among the set of all possible permutations, $\wp \neg \{P_{11}, P_{12}, \ldots P_{1m!}\}$. These permutations are each represented by an m×m square matrix. In a particular instance of the 5PP, the destination knows both $P_{1a} \cdot c_i$ and $c_i$ for n different values of i, but does not know and must calculate $P_{1a}$. The $c_i \in c$ are random m-bit binary words. The permutation recovery algorithm (PRA) may not yield a unique solution for $P_{1a}$ since a second permutation matrix $P_{1b}$ may yield the same result: $P_{1b} \cdot c_i = P_{1a} \cdot c_i$. Multiplying by the transpose of $P_{1a}$ we get the result, $P_{1a}{}^t \cdot P_{1b} \cdot c_i = C_i$. Since $P_{1a}{}^t \cdot P_{1a} = I_m$, the m-bit identity matrix, and since a permutation of a permutation is a permutation, all cases of the product matrix $P_{1a} \cdot P_{1b} \in \wp$. For brevity, let $P_{1a}{}^t \cdot P_{1b} \neg P_{1c}$ so that solutions of the equation $P_{1c} \cdot c_i = c_i$ include unique solutions when there is a single permutation solution $P_{1c}$ for a given $c_i$ and ambiguous solutions when there are two or more permutations each satisfying the equation $P_{1c} \cdot c_i = c_i$.

Symmetry.

Let $\overline{c}_i$ represent the compliment of $c_i$ with all ones replaced by zeros and all zeros replaced by ones. If and only if $P_{1c} \cdot c_i = c_i$ is true, then $P_{1c} \cdot \overline{c}_i = \overline{c}_i$ is also true. This is easy to show by addition: $P_{1c} \cdot (c_i + \overline{c}_i) = c_i + \overline{c}_i$ must be true since $c_i + \overline{c}_i = \{1, 1, \ldots 1\}$. Note that any permutation of ones in this result leaves it unchanged. If $P_{1c} \cdot \overline{c}_i \neq \overline{c}_i$, then as again seen by addition: $P_{1c} \cdot (c_i + \overline{c}_i) \neq c_i + \overline{c}_i$. Thus, there is symmetry between corresponding pairs $(c_i, \overline{c}_i)$ when $c_i \leq \{0, 1, 1, \ldots 1\}$, $\overline{c}_i \geq \{1, 0, 0, \ldots 0\}$ and, $c_i + \overline{c}_i = \{1, 1, 1, \ldots 1\}$.

Universality of Identity Permutation.

It is possible, but tedious, to evaluate $P_{1c} \cdot c_i = c_i$ for all values of $P_{1c} \in \wp$ and $c_i \in c$, a total of $m! \times 2^{m \cdot n}$ results, particularly since m! and $2^{m \times n}$ may be very large numbers. However, we note that for a given $P_{1c} \in \wp$ and for n values of $c_i \in c$, the PRA will produce either a unique result, permutation $P_{1c}$ or an ambiguous result with two or more permutations, including $P_{1c}$. If we choose another permutation $P_{1c}'$ and permute the n values of $c_i$ accordingly to get n values $c_i'$, the two results of $P_{1c} \cdot c_i = c_i$ and $P_{1c}' \cdot c_i' = c_i'$ will be indistinguishable except for permutation. Thus, both results will be either unique or ambiguous. When we consider all possible permutations, they will each produce different resulting values, but the same number of unique results and the same number of ambiguous results. Therefore, we choose $P_{1c} = I_m$, the identity matrix when calculating the number of ambiguous results, confident that that number will be the same for all $P_{1c} \in \wp$.

Probability of Ambiguity.

We wish to calculate p(m, n), the probability of obtaining an ambiguous result using the PRA to solve $P_{1c} \cdot c_i = c_i$. We begin by calculating an approximation to the probability of a unique result, 1−p(m,n). There are many ways to obtain a unique result. To demonstrate this we examine the case, m×n=4×4 where $P_{1c} = I_4$, c={$c_1, c_2, c_3, c_4$}=d. Using the PRA algorithm as described in Appendix 1 we get the recovery table:

$$c = d = \{\{1, 0, 1, 1\}, \{0, 1, 1, 1\}, \{1, 0, 0, 0\}, \{0, 0, 1, 1\}\}$$

$$\{1, 0, 1, 1\}, \{0, 1, 0, 0\}, \{1, 0, 1, 1\}, \{1, 0, 1, 1\}$$

$$\{1, 0, 0, 0\}, \{0, 1, 1, 1\}, \{0, 1, 1, 1\}, \{0, 1, 1, 1\}$$

$$\{1, 0, 0, 0\}, \{0, 1, 1, 1\}, \{0, 1, 1, 1\}, \{0, 1, 1, 1\}$$

$$\underline{\{1, 1, 0, 0\}, \{1, 1, 0, 0\}, \{0, 0, 1, 1\}, \{0, 0, 1, 1\}}$$

$$\{4, 1, 1, 1\}, \{1, 4, 2, 2\}, \{1, 2, 4, 4\}, \{1, 2, 4, 4\}$$

As before the result can be read off the bottom line by identifying the positions where the total is 4. As we should expect from the universality of the identity permutation, this result is also ambiguous. It could be either {1,2,3,4} or {1,2,4,3}. If there were no other constraints and the extra columns of 1s and 0s were completely random, the probability would be $$\left(\frac{1}{2}\right)^4 = \frac{1}{16}.$$

How many ways can this second column of 1s appear? Two columns of 1s can appear in $$\binom{4}{2} = 6$$

ways. Looking at it in a more granular way we have, $$1100 \ 1010 \ 1001 = > \binom{3}{1}$$

$$0100 \ 0101 = > \binom{2}{1}$$

$$0011 = > \binom{1}{1}$$

Adding the binomial coefficients together yields, $$\binom{3}{1} + \binom{2}{1} + \binom{1}{1} = 3 + 2 + 1 = 6$$

This is the result given originally above, but the granular approach is more easily generalized. Thus, when m=n=4 and considering only the possibility of one extra column (4 bits) of 1s, the probability of a unique result is $$\left(1 - \left(\frac{1}{2}\right)^4\right)^{\binom{3}{1}+\binom{2}{1}+\binom{1}{1}} = \left(1 - \left(\frac{1}{2}\right)^4\right)^{3+2+1}.$$

However, there are two other possibilities: Two extra columns (2·4=8 bits) of 1s can occur $$\binom{2}{1} + \binom{1}{1} = 3$$

different ways requiring 8 bits to be 1. Three extra columns (3·4=12 bits) being 1s can occur in only one way, $$\binom{1}{1} = 1.$$

Multiplying the probabilities of each of these events failing to occur gives the probability of a unique event, $$1 - p_F(4, 4) = \left(1 - \left(\frac{1}{2}\right)^4\right)^{3+2+1}\left(1 - \left(\frac{1}{2}\right)^8\right)^{2+1}\left(1 - \left(\frac{1}{2}\right)^{12}\right) = 0.668225$$

From this result we calculate $p_F(4,4) = 0.331775$, which can be checked by random simulation, $p_R(4,4) = 0.33218$, and by exhaustive iteration, $p_I(4,4)=0.333496$. These results are all slightly different. The random simulation $p_R(4,4)$ is expected to be different on each run because of the million random selections of four c words. However, the iterative solution is repeatable and emphasizes the statement that the formula for $1-p_F(4,4)$ was an approximation.

The general formula only approximates the individual components of the ambiguity because we assume the binary digits in a recovery table column are random and independent of each other. They are not completely so since a bit in one column has a dependency on the corresponding bit in an adjacent column. Also, the actual number of ambiguous results must be an integer, but the formula gives $p_F(4,4) \cdot 2^{4 \cdot 4}=21,743.2064$ which is not an integer and $p_I(4,4) \cdot 2^{4 \cdot 4}=21,856$ is an integer. However, $p_F(m,n)$ is always close to the value of ambiguity given by the exhaustive iteration of results. To verify this observation, we generalize the formula for $p_F$.

$$p_F(4, 4) = 1 - \left(1-\left(\frac{1}{2}\right)^4\right)^{3+2+1}\left(1-\left(\frac{1}{2}\right)^8\right)^{2+1}\left(1-\left(\frac{1}{2}\right)^{12}\right)$$

$$= 1 - \prod_{i=1}^{4-1}\prod_{k=1}^{4-i}(1-1/2^{4i})^{\binom{4-k}{i}}$$

For other values of m and n this becomes $$p_F(m, n) = 1 - \prod_{i=1}^{m-1}\prod_{k=1}^{m-i}(1-1/2^{ni})^{\binom{m-k}{i}}$$

This generalization can be checked by calculating $p_I(m,n)$, $p_R(m,n)$ and $p_F(m,n)$ for various values of m and n. The results are shown in the following table:

| m/n | | 4 | 8 | 16 | 32 | 64 |
|---|---|---|---|---|---|---|
| 4 | I | 0.333496 | 0.023270 | | | |
| | R | 0.333218 | 0.023007 | 0.000091 | | |
| | F | 0.331775 | 0.023269 | 0.000091 | $1.39*10^{-9}$ | 0 |
| 8 | I | 0.879180 | | | | |
| | R | 0.879135 | 0.104619 | 0.000431 | | |
| | F | 0.870520 | 0.104567 | 0.000427 | $6.52*10^{-9}$ | 0 |
| 16 | I | | | | | |
| | R | 0.999998 | 0.380574 | 0.001784 | | |
| | F | 0.999971 | 0.380178 | 0.001829 | $2.78*10^{-8}$ | 0 |
| 32 | I | | | | | |
| | R | | 0.867457 | 0.007450 | | |
| | F | 1 | 0.867234 | 0.007541 | $1.15*10^{-7}$ | 0 |
| 64 | I | | | | | |
| | R | | | 0.030164 | | |
| | F | | 0.999810 | 0.030303 | $4.69*10^{-7}$ | $1.11*10^{-16}$ |
| 128 | I | | | | | |
| | R | | | | 0.000002 | |
| | F | | 1 | 0.116712 | $1.89*10^{-6}$ | $4.44*10^{-16}$ |
| 256 | I | | | | | |
| | R | | | | 0.000000 | |
| | F | | | 0.392677 | $7.59*10^{-6}$ | $1.78*10^{-15}$ |

The exhaustive iteration simulation (I) is an $O(2^{m \cdot n})$ calculation. It becomes exponentially impractical for $m \cdot n > 32$. The random simulation (R) grows arithmetically but matches closely the I simulation for $m \cdot n \leq 32$. Thus, we can use it as a proxy for I for $m \cdot n > 32$. Because of the correlations between columns and the non-integer approximations in the formula, results are only approximate. The root-mean-square error of the formula (F) with respect to random simulation (R) is 0.53% for the dozen results with $n=4$, 8 and 16. The average error for these same values of n is $-0.04\%$. Contributions to this error are the between-column correlations, the non-integer nature of the formula and the random variation of the simulated results of the PRA when using random c words.

What is claimed is:

1. A system for cryptographic exchange of a secret data matrix, the system comprising:
    a first computer system, the first computer system comprising a first processor and a first memory, the first processor for cooperation with the first memory to carry out operations for cryptographic exchange of the secret data matrix; and
    a second computer system, the second computer system comprising a second processor and a second memory, the second processor for cooperation with the second memory to carry out operations for cryptographic exchange of the secret data matrix;
    wherein the secret data matrix is known by the first computer system but is not shared with the second computer system in unobscured form;
    wherein the first and second computer systems are configured to share over a network a series of at least five messages in at least five passes between each other that collectively hide the secret data matrix using reversible logic operations that obscure the secret data matrix according to at least five parameters, wherein the at least five parameters comprise (1) first and second parameters that are known by the first computer system but are not shared with the second computer system in unobscured form, and (2) third, fourth, and fifth parameters that are known by the second computer system but are not shared with the first computer system in unobscured form; and
    wherein the second computer system is configured to derive the secret data matrix based on the series of at least five messages.

2. The system of claim 1 wherein the first and/or second computer systems are configured to generate a key based on the secret data matrix, the generated key for use with encryption and/or decryption operations.

3. The system of claim 2 wherein the first and/or second computer systems are configured to encrypt and/or decrypt data based on the generated key.

4. The system of claim 2 wherein the first computer system and the second computer system are configured to encrypt and decrypt HTTP communications with each other based on the generated key.

5. The system of claim 2 wherein the parameters are independent parameters.

6. The system of claim 2 wherein the parameters are randomly generated.

7. The system of claim 2 wherein the reversible logic operations include permutation and addition operations.

8. The system of claim 2 wherein the at least five messages comprise at least eight messages that collectively hide the secret data matrix using reversible logic operations that obscure the secret data matrix according to at least nine parameters of which (1) at least six are known by the first computer system but not shared with the second computer system in unobscured form and (2) at least three are known by the second computer system but not shared with the first computer system in unobscured form.

9. The system of claim 8 wherein the at least nine parameters are randomized parameters, and wherein the secret data matrix is a combination of a plurality of the parameters that are known by the first computer system but not shared with the second computer system in unobscured form.

10. The system of claim 9 wherein the randomized parameters comprise matrices of X bits by X bits, wherein X is a value between 32 bits and 1024 bits.

11. The system of claim 9 wherein the at least nine parameters comprise (1) three variable matrices that are known by the first computer system but not shared with the second computer system in unobscured form, (2) three permutation matrices that are known by the first computer system but not shared with the second computer system in unobscured form, (3) a variable matrix that is known by the second computer system but not shared with the first computer system in unobscured form, and (4) two permutation matrices that are known by the second computer system but not shared with the first computer system in unobscured form.

12. The system of claim 11 wherein the secret data matrix comprises a combination of (1) one of the variable matrices that is known by the first computer system but not shared with the second computer system in unobscured form and (2) two of the permutation matrices that are known by the first computer system but not shared with the second computer system in unobscured form.

13. The system of claim 11 wherein the three permutation matrices that are known by the first computer system but not shared with the second computer system in unobscured form operate to produce column-wise permutation; and wherein the two permutation matrices that are known by the second computer system but not shared with the first computer system in unobscured form operate to produce row-wise permutation.

14. The system of claim 13 wherein the at least eight messages comprise:

a first message generated by the first computer system and shared with the second computer system, wherein the first message combines (1) a first of the variable matrices that is known by the first computer system but not shared with the second computer system in unobscured form, (2) a first of the permutation matrices that is known by the first computer system but not shared with the second computer system in unobscured form, and (3) a second of the variable matrices that is known by the first computer system but not shared with the second computer system in unobscured form;

a second message generated by the first computer system and shared with the second computer system, wherein the second message combines (1) the second variable matrix that is known by the first computer system but not shared with the second computer system in unobscured form, (2) a transpose of the first permutation matrix that is known by the first computer system but not shared with the second computer system in unobscured form, and (3) a second of the permutation matrices that is known by the first computer system but not shared with the second computer system in unobscured form;

a third message generated by the first computer system and shared with the second computer system, wherein the third message combines (1) a third of the variable matrices that is known by the first computer system but not shared with the second computer system in unobscured form and (2) a third of the permutation matrices that is known by the first computer system but not shared with the second computer system in unobscured form;

a fourth message generated by the second computer system and shared with the first computer system, wherein the fourth message combines (1) the first message, (2) a first of the permutation matrices that is known by the second computer system but not shared with the first computer system in unobscured form, and (3) a first of the variable matrices that is known by the second computer system but not shared with the first computer system in unobscured form;

a fifth message generated by the second computer system and shared with the first computer system, wherein the fifth message combines (1) the first of the variable matrices that is known by the second computer system but not shared with the first computer system in unobscured form, (2) a transpose of the first of the permutation matrices that is known by the second computer system but not shared with the first computer system in unobscured form, and (3) a second of the permutation matrices that is known by the second computer system but not shared with the first computer system in unobscured form;

a sixth message generated by the first computer system and shared with the second computer system, wherein the sixth message combines (1) the fourth message, (2) the transpose of the first permutation matrix that is known by the first computer system but not shared with the second computer system in unobscured form, (3) the second of the permutation matrices that is known by the first computer system but not shared with the second computer system in unobscured form, and (4) the fourth variable matrix that is known by the first computer system but not shared with the second computer system in unobscured form;

a seventh message generated by the second computer system and shared with the first computer system, wherein the seventh message combines (1) the sixth message, (2) a combination of the second message and the first of the permutation matrices that is known by the second computer system but not shared with the first computer system in unobscured form, (3) the transpose of the first of the permutation matrices that is known by the second computer system but not shared with the first computer system in unobscured form, and (4) the second of the permutation matrices that is known by the second computer system but not shared with the first computer system in unobscured form; and an eighth message generated by the first computer system and shared with the second computer system, wherein the eighth message combines (1) the seventh message, (2) a combination of (i) the fifth message, (ii) the transpose of first of the permutation matrices that is known by the first computer system but not shared with the second computer system in unobscured form, and (iii) the second of the permutation matrices that is known by the first computer system but not shared with the second computer system in unobscured form, and (3) the third of the permutation matrices that is known by the first computer system but not shared with the second computer system in unobscured form; and wherein the second computer system is further configured to derive the secret data matrix based on (1) the eighth message, (2) the transpose of the second permutation matrix that is known by the second computer system but not shared with the first computer system in unobscured form, (3) the third message, and (2) the transpose of the first permutation matrix that is known by the second computer system but not shared with the first computer system in unobscured form so that the secret data matrix comprise a combination of (1) the first variable matrix that is known by the first computer system but not shared with the second computer system in unobscured form, (2) the second permutation matrix that is known by the first computer system but not shared with the second computer system in unobscured form, and (3) the third permutation matrix that is known by the first computer system but not shared with the second computer system in unobscured form.

15. The system of claim 1 wherein the first processor and/or the second processor comprises a hardware logic circuit configured to implement logic operations relating to the series of at least five messages.

16. The system of claim 15 wherein the hardware logic circuit is implemented on a field programmable gate array (FPGA).

17. The system of claim 1 wherein the first processor and/or the second processor comprises a graphics processor unit (GPU) configured to implement logic operations relating to the series of at least five messages.

18. The system of claim 1 wherein the first and second computer systems are configured for authentication of their identities based on (1) certificates of authority (CA) prior to initiating the series of at least five messages and/or (2) multi-factor authentication (MFA) prior to initiating the series of at least five messages.

19. A system for cryptographic exchange of a secret data matrix, the system comprising:
a processor; and
a memory;
wherein the processor, in cooperation with the memory, is configured to generate, communicate, and receive a plurality of message matrices with respect to another computer system over at least five passes in order to share a secret data matrix with the another computer system in a manner that allows the another computer system to derive the secret data matrix, wherein the message matrices collectively hide the secret data matrix when in transit between the processor and the another computer system using reversible logic operations that obscure the secret data matrix according to at least five parameters of which (1) at least three are not shared with the processor by the another computer system in unobscured form and (2) at least two are not shared by the processor with the another computer system in unobscured form; and
wherein the processor, in cooperation with the memory, is further configured to (1) generate the at least two parameters that are not shared with the another computer system in unobscured form and (2) generate the secret data matrix, wherein the generated secret data matrix is not shared with the another computer system in unobscured form.

20. A system for cryptographic exchange of a secret data matrix, the system comprising:
a processor; and
a memory;
wherein the processor, in cooperation with the memory, is configured to receive, generate, and communicate a plurality of message matrices with another computer system over at least five passes in order to derive a secret data matrix that is obscured within the message matrices because the message matrices collectively hide the secret data matrix when in transit between the processor and the another computer system based on reversible logic operations that obscure the secret data matrix according to at least five parameters of which (1) at least two are not shared with the processor in unobscured form and (2) at least three are not shared with the another computer system in unobscured form;
wherein the processor is configured to generate the at least three parameters that are not shared with the another computer system in unobscured form; and
wherein the processor, in cooperation with the memory, is further configured to (1) receive at least three of the message matrices from the another computer system and (2) derive the secret data matrix based on (i) the received at least three message matrices and (ii) the generated at least three parameters that are not shared with the another computer system in unobscured form.

21. The system of claim 1 wherein derivation of the secret data matrix by the second computer system results in the secret data matrix becoming a shared secret between the first and second computer systems that is not known by an eavesdropper of the at least five messages.

22. The system of claim 1 wherein the at least five messages comprise five messages in five different passes, wherein both permutation and modular arithmetic operations are applied to generate each of the five messages for the five different passes to protect confidentiality of the secret data matrix with respect to eavesdropping of the five messages in the five different passes.

23. The system of claim 22 wherein the permutation and modular arithmetic operations include permutation and modular arithmetic operations that are based on the first, second, third, fourth, and fifth parameters.

24. The system of claim 23 wherein the five different passes comprise:
a first pass comprising a first message, wherein the first message is communicated from the first computer system to the second computer system, and wherein the first computer system is configured to generate the first message using a permutation operation based on the first parameter and a modular arithmetic operation based on the second parameter;
a second pass comprising a second message, wherein the second message is communicated from the second computer system to the first computer system, and wherein the second computer system is configured to generate the second message using a permutation operation based on the third parameter and a modular arithmetic operation based on the fourth parameter;
a third pass comprising a third message, wherein the third message is communicated from the first computer system to the second computer system, and wherein the first computer system is configured to generate the third message using a permutation operation based on the first parameter and a modular arithmetic operation based on the second parameter;
a fourth pass comprising a fourth message, wherein the fourth message is communicated from the second computer system to the first computer system, and wherein the second computer system is configured to generate the fourth message using a permutation operation based on the third parameter and a modular arithmetic operation based on the fifth parameter; and
a fifth pass comprising a fifth message, wherein the fifth message is communicated from the first computer system to the second computer system, and wherein the first computer system is configured to generate the fifth message using a permutation operation based on the first parameter and a modular arithmetic operation based on the secret data matrix.

25. The system of claim 23 wherein the five different passes comprise:
- a first pass comprising a first message, wherein the first message is communicated from the first computer system to the second computer system, and wherein the first computer system is configured to generate the first message using a permutation operation based on the first parameter and a modular arithmetic operation based on the second parameter;
- a second pass comprising a second message, wherein the second message is communicated from the second computer system to the first computer system, and wherein the second computer system is configured to generate the second message using a permutation operation based on the third parameter and a modular arithmetic operation based on the fourth parameter;
- a third pass comprising a third message, wherein the third message is communicated from the first computer system to the second computer system, and wherein the first computer system is configured to generate the third message using a permutation operation based on the first parameter and a modular arithmetic operation based on a sixth parameter, wherein the sixth parameter is not shared with the second computer system in unobscured form;
- a fourth pass comprising a fourth message, wherein the fourth message is communicated from the second computer system to the first computer system, and wherein the second computer system is configured to generate the fourth message using a permutation operation based on the fifth parameter and a modular arithmetic operation based on the third parameter; and
- a fifth pass comprising a fifth message, wherein the fifth message is communicated from the first computer system to the second computer system, and wherein the first computer system is configured to generate the fifth message using a permutation operation based on a seventh parameter and a modular arithmetic operation based on the first parameter, wherein the seventh parameter is not shared with the second computer system in unobscured form.

26. The system of claim 25 wherein the first pass further comprises a sixth message and a seventh message, wherein the sixth and seventh messages are communicated from the first computer system to the second computer system, wherein the first computer system is further configured to (1) generate the sixth message based on the first parameter, am eighth parameter, and a ninth parameter and (2) generate the seventh message based on the sixth parameter and the seventh parameter, and wherein the eighth and ninth parameters are not shared with the second computer system in unobscured form;
- wherein the second pass further comprises an eighth message, wherein the eighth message is communicated from the second computer system to the first computer system, and wherein the second computer system is further configured to generate the eighth message based on the third, fourth, and fifth parameters; and
- wherein the second computer system is further configured to derive the secret data matrix based on the series of the first, second, third, fourth, fifth, sixth, seventh, and eighth messages.

27. The system of claim 1 wherein the first processor comprises a plurality of first processors, wherein the first memory comprises a plurality of first memories, wherein the second processor comprises a plurality of second processors, and wherein the second memory comprises a plurality of second memories.

28. The system of claim 19 wherein the message matrices allow the another computer system to derive the secret data matrix, which results in the secret data matrix becoming a shared secret between the processor and the another computer system that is not known by an eavesdropper of the message matrices.

29. The system of claim 19 wherein the message matrices comprise five message matrices in five different passes, wherein both permutation and modular arithmetic operations are applied to generate each of the five message matrices for the five different passes to protect confidentiality of the secret data matrix with respect to eavesdropping of the five message matrices in the five different passes.

30. The system of claim 29 wherein the permutation and modular arithmetic operations include permutation and modular arithmetic operations that are based on the at least five parameters.

31. The system of claim 30 wherein the five different passes comprise:
- a first pass comprising a first message matrix, wherein the first message matrix is communicated from the processor to the another computer system, wherein the processor is configured to generate the first message matrix using a permutation operation based on a first parameter and a modular arithmetic operation based on a second parameter, and wherein the first and second parameters are not shared by the processor with the another computer system in unobscured form;
- a second pass comprising a second message matrix, wherein the second message matrix is communicated from the another computer system to the processor, wherein the another computer system is configured to generate the second message matrix using a permutation operation based on a third parameter and a modular arithmetic operation based on a fourth parameter, and wherein the third and fourth parameters are not shared by the another computer system with the processor in unobscured form;
- a third pass comprising a third message matrix, wherein the third message matrix is communicated from the processor to the another computer system, and wherein the processor is configured to generate the third message matrix using a permutation operation based on the first parameter and a modular arithmetic operation based on the second parameter;
- a fourth pass comprising a fourth message matrix, wherein the fourth message matrix is communicated from the another computer system to the processor, wherein the another computer system is configured to generate the fourth message matrix using a permutation operation based on the third parameter and a modular arithmetic operation based on a fifth parameter, and wherein the fifth parameter is not shared by the another computer system with the processor in unobscured form; and
- a fifth pass comprising a fifth message matrix, wherein the fifth message matrix is communicated from the processor to the another computer system, and wherein the processor is configured to generate the fifth message matrix using a permutation operation based on the first parameter and a modular arithmetic operation based on the secret data matrix.

32. The system of claim 30 wherein the five different passes comprise:
- a first pass comprising a first message matrix, wherein the first message matrix is communicated from the processor to the another computer system, wherein the processor is configured to generate the first message matrix using a permutation operation based on a first parameter and a modular arithmetic operation based on a second parameter, and wherein the first and second parameters are not shared by the processor with the another computer system in unobscured form;
- a second pass comprising a second message matrix, wherein the second message matrix is communicated from the another computer system to the processor, wherein the another computer system is configured to generate the second message matrix using a permutation operation based on a third parameter and a modular arithmetic operation based on a fourth parameter, and wherein the third and fourth parameters are not shared by the another computer system with the processor in unobscured form;
- a third pass comprising a third message matrix, wherein the third message matrix is communicated from the processor to the another computer system, wherein the processor is configured to generate the third message matrix using a permutation operation based on the first parameter and a modular arithmetic operation based on a sixth parameter, and wherein the sixth parameter is not shared by the processor with the another computer system in unobscured form;
- a fourth pass comprising a fourth message matrix, wherein the fourth message matrix is communicated from the another computer system to the processor, wherein the another computer system is configured to generate the fourth message matrix using a permutation operation based on a fifth parameter and a modular arithmetic operation based on the third parameter, and wherein the fifth parameter is not shared by the another computer system with the processor in unobscured form; and
- a fifth pass comprising a fifth message matrix, wherein the fifth message matrix is communicated from the processor to the another computer system, wherein the processor is configured to generate the fifth message matrix using a permutation operation based on a seventh parameter and a modular arithmetic operation based on the first parameter, and wherein the seventh parameter is not shared by the processor with the another computer system in unobscured form.

33. The system of claim 32 wherein the first pass further comprises a sixth message matrix and a seventh message matrix, wherein the sixth and seventh message matrices are communicated from the processor to the another computer system, wherein the processor is further configured to (1) generate the sixth message matrix based on the first parameter, an eighth parameter, and a ninth parameter and (2) generate the seventh message matrix based on the sixth parameter and the seventh parameter, and wherein the eighth and ninth parameters are not shared with the another computer system in unobscured form;
wherein the second pass further comprises an eighth message matrix, wherein the eighth message matrix is communicated from the another computer system to the processor, and wherein the another computer system is further configured to generate the eighth message matrix based on the third, fourth, and fifth parameters; and wherein the another computer system is further configured to derive the secret data matrix based on the series of the first, second, third, fourth, fifth, sixth, seventh, and eighth message matrices.

34. The system of claim 19 wherein the processor comprises a plurality of processors, and wherein the memory comprises a plurality of memories.

35. The system of claim 20 wherein derivation of the secret data matrix by the processor results in the secret data matrix becoming a shared secret between the processor and the another computer system that is not known by an eavesdropper of the message matrices.

36. The system of claim 20 wherein the message matrices comprise five message matrices in five different passes, wherein both permutation and modular arithmetic operations are applied to generate each of the five message matrices for the five different passes to protect confidentiality of the secret data matrix with respect to eavesdropping of the five message matrices in the five different passes.

37. The system of claim 36 wherein the permutation and modular arithmetic operations include permutation and modular arithmetic operations that are based on the at least five parameters.

38. The system of claim 37 wherein the five different passes comprise:
- a first pass comprising a first message matrix, wherein the first message matrix is communicated from the another computer system to the processor, wherein the another computer system is configured to generate the first message matrix using a permutation operation based on a first parameter and a modular arithmetic operation based on a second parameter, and wherein the first and second parameters are not shared by the another computer system with the processor in unobscured form;
- a second pass comprising a second message matrix, wherein the second message matrix is communicated from the processor to the another computer system, wherein the processor is configured to generate the second message matrix using a permutation operation based on a third parameter and a modular arithmetic operation based on a fourth parameter, and wherein the third and fourth parameters are not shared by the processor with the another computer system in unobscured form;
- a third pass comprising a third message matrix, wherein the third message matrix is communicated from the another computer system to the processor, and wherein the another computer system is configured to generate the third message matrix using a permutation operation based on the first parameter and a modular arithmetic operation based on the second parameter;
- a fourth pass comprising a fourth message matrix, wherein the fourth message matrix is communicated from the processor to the another computer system, wherein the processor is configured to generate the fourth message matrix using a permutation operation based on the third parameter and a modular arithmetic operation based on a fifth parameter, and wherein the fifth parameter is not shared by the processor with the another computer system in unobscured form; and
- a fifth pass comprising a fifth message matrix, wherein the fifth message matrix is communicated from the another computer system to the processor, and wherein the another computer system is configured to generate the fifth message matrix using a permutation operation based on the first parameter and a modular arithmetic operation based on the secret data matrix.

39. The system of claim 37 wherein the five different passes comprise:
- a first pass comprising a first message matrix, wherein the first message matrix is communicated from the another computer system to the processor, wherein the another computer system is configured to generate the first message matrix using a permutation operation based on a first parameter and a modular arithmetic operation based on a second parameter, and wherein the first and second parameters are not shared by the another computer system with the processor in unobscured form;
- a second pass comprising a second message matrix, wherein the second message matrix is communicated from the processor to the another computer system, wherein the processor is configured to generate the second message matrix using a permutation operation based on a third parameter and a modular arithmetic operation based on a fourth parameter, and wherein the third and fourth parameters are not shared by the processor with the another computer system in unobscured form;
- a third pass comprising a third message matrix, wherein the third message matrix is communicated from the another computer system to the processor, wherein the another computer system is configured to generate the third message matrix using a permutation operation based on the first parameter and a modular arithmetic operation based on a sixth parameter, and wherein the sixth parameter is not shared by the another computer system with the processor in unobscured form;
- a fourth pass comprising a fourth message matrix, wherein the fourth message matrix is communicated from the processor to the another computer system, wherein the processor is configured to generate the fourth message matrix using a permutation operation based on a fifth parameter and a modular arithmetic operation based on the third parameter, and wherein the fifth parameter is not shared by the processor with the another computer system in unobscured form; and
- a fifth pass comprising a fifth message matrix, wherein the fifth message matrix is communicated from the another computer system to the processor, wherein the another computer system is configured to generate the fifth message matrix using a permutation operation based on a seventh parameter and a modular arithmetic operation based on the first parameter, and wherein the seventh parameter is not shared by the another computer system with the processor in unobscured form.

40. The system of claim 39 wherein the first pass further comprises a sixth message matrix and a seventh message matrix, wherein the sixth and seventh message matrices are communicated from the another computer system to the processor, wherein the another computer system is further configured to (1) generate the sixth message matrix based on the first parameter, an eighth parameter, and a ninth parameter and (2) generate the seventh message matrix based on the sixth parameter and the seventh parameter, and wherein the eighth and ninth parameters are not shared by the another computer system with the processor in unobscured form;
- wherein the second pass further comprises an eighth message matrix, wherein the eighth message matrix is communicated from the processor to the another computer system, and wherein the processor is further configured to generate the eighth message matrix based on the third, fourth, and fifth parameters; and
- wherein the processor is further configured to derive the secret data matrix based on the series of the first, second, third, fourth, fifth, sixth, seventh, and eighth message matrices.

41. The system of claim 20 wherein the processor comprises a plurality of processors, and wherein the memory comprises a plurality of memories.

* * * * *